US011467999B2

(12) United States Patent
Das Sharma

(10) Patent No.: US 11,467,999 B2
(45) Date of Patent: *Oct. 11, 2022

(54) NEGOTIATING ASYMMETRIC LINK WIDTHS DYNAMICALLY IN A MULTI-LANE LINK

(71) Applicant: Intel Corporation, Santa Clara, CA (US)

(72) Inventor: Debendra Das Sharma, Saratoga, CA (US)

(73) Assignee: Intel Corporation, Santa Clara, CA (US)

(*) Notice: Subject to any disclaimer, the term of this patent is extended or adjusted under 35 U.S.C. 154(b) by 836 days.

This patent is subject to a terminal disclaimer.

(21) Appl. No.: 16/023,739

(22) Filed: Jun. 29, 2018

(65) Prior Publication Data

US 2019/0042524 A1 Feb. 7, 2019

(51) Int. Cl.
  G06F 13/42 (2006.01)
  G06F 13/40 (2006.01)

(52) U.S. Cl.
  CPC ...... G06F 13/4282 (2013.01); G06F 13/4068 (2013.01); *G06F 2213/0026* (2013.01)

(58) Field of Classification Search
  CPC ............ G06F 13/4282; G06F 13/4068; G06F 2213/0026
  See application file for complete search history.

(56) References Cited

U.S. PATENT DOCUMENTS

| 6,970,013 | B1 | 11/2005 | Cory |
| 7,136,953 | B1 | 11/2006 | Bisson et al. |
| 7,468,754 | B2 | 12/2008 | Carlsgaard et al. |
| 7,469,311 | B1* | 12/2008 | Tsu ..................... G06F 13/4018 710/307 |
| 7,793,030 | B2 | 9/2010 | Jenkins et al. |
| 7,809,969 | B2 | 10/2010 | Sharma et al. |
| 8,627,156 | B1 | 1/2014 | Erickson |
| 9,183,171 | B2 | 11/2015 | Iyer et al. |
| 9,229,897 | B2 | 1/2016 | Iyer et al. |

(Continued)

OTHER PUBLICATIONS

USPTO; Final Office Action issued in U.S. Appl. No. 16/826,001, dated Mar. 31, 2021; 29 pages.

(Continued)

*Primary Examiner* — Henry Tsai
*Assistant Examiner* — Harry Z Wang
(74) *Attorney, Agent, or Firm* — Alliance IP, LLC

(57) ABSTRACT

Aspects of the embodiments are directed to a port comprising hardware to support the multi-lane link, the link comprising a lane that comprises a first differential signal pair and a second differential signal pair. Link configuration logic, implemented at least in part in hardware circuitry, can determine that the port comprises hardware to support one or both of receiving data on the first differential signal pair or transmitting data on the second differential signal pair, and reconfigure the first differential signal pair to receive data with the second differential signal pair or reconfigure the second differential signal pair to transmit data with the first differential signal pair; and wherein the port is to transmit data or receive data based on reconfiguration of one or both the first differential signal pair and the second differential signal pair.

25 Claims, 17 Drawing Sheets

(56) References Cited

U.S. PATENT DOCUMENTS

| | | |
|---|---|---|
| 9,244,872 B2 | 1/2016 | Barbiero et al. |
| 9,355,058 B2 | 5/2016 | Iyer et al. |
| 10,601,425 B2 | 3/2020 | Sharma |
| 10,846,247 B2 | 11/2020 | Sharma |
| 2005/0160212 A1* | 7/2005 | Caruk ............... G06F 13/40 |
| | | 710/301 |
| 2006/0023633 A1 | 2/2006 | Caruk et al. |
| 2007/0150762 A1 | 6/2007 | Sharma et al. |
| 2007/0234080 A1* | 10/2007 | Mackey ............ G06F 1/3203 |
| | | 713/300 |
| 2009/0040373 A1 | 2/2009 | Lo |
| 2011/0106989 A1* | 5/2011 | Solomon ........... G06F 13/102 |
| | | 710/63 |
| 2011/0158261 A1 | 6/2011 | Chen |
| 2011/0222111 A1 | 9/2011 | Shima |
| 2012/0005512 A1 | 1/2012 | Chew |
| 2012/0079156 A1 | 3/2012 | Safranek et al. |
| 2012/0082463 A1 | 4/2012 | Kasprzyk |
| 2012/0191921 A1* | 7/2012 | Shaeffer ........... G06F 1/3275 |
| | | 710/316 |
| 2014/0006674 A1* | 1/2014 | Chan ................. G06F 13/4221 |
| | | 710/313 |
| 2014/0006675 A1 | 1/2014 | Meir |
| 2014/0114887 A1 | 4/2014 | Iyer et al. |
| 2014/0115207 A1 | 4/2014 | Iyer et al. |
| 2014/0195833 A1* | 7/2014 | Wang ................. G06F 1/3203 |
| | | 713/320 |
| 2015/0092791 A1* | 4/2015 | Cornett ............. H04L 7/0087 |
| | | 370/468 |
| 2016/0041604 A1 | 2/2016 | Choi et al. |
| 2016/0147705 A1 | 5/2016 | Arroyo et al. |
| 2016/0179427 A1 | 6/2016 | Jen et al. |
| 2016/0179647 A1 | 6/2016 | Sharma et al. |
| 2016/0179730 A1 | 6/2016 | Halleck et al. |
| 2016/0182154 A1 | 6/2016 | Fang et al. |
| 2016/0216758 A1 | 7/2016 | Kachare et al. |
| 2016/0283112 A1* | 9/2016 | Blankenship ......... G06F 3/0671 |
| 2016/0283375 A1 | 9/2016 | Sharma et al. |
| 2016/0377679 A1 | 12/2016 | Froelich et al. |
| 2017/0116090 A1 | 4/2017 | Arroyo et al. |
| 2017/0163286 A1 | 6/2017 | Wu et al. |
| 2017/0351640 A1 | 12/2017 | Nilange et al. |
| 2017/0371831 A1 | 12/2017 | Sharma |
| 2019/0041898 A1 | 2/2019 | Harriman et al. |
| 2019/0131974 A1 | 5/2019 | Sharma |
| 2019/0196991 A1 | 6/2019 | Sharma |
| 2019/0286605 A1 | 9/2019 | Harriman |
| 2020/0226084 A1 | 7/2020 | Sharma |
| 2020/0287548 A1 | 9/2020 | Sharma |

OTHER PUBLICATIONS

EPO; Extended European Search Report issued in EP Patent Application No. 20217133.6, dated Jun. 10, 2021; 16 pages.
EPO; Extended European Search Report issued in EP Patent Application No. 20155557.0, dated May 25, 2020; 11 pages.
USPTO; Non-Final Office Action issued in U.S. Appl. No. 16/219,883, dated Jul. 22, 2019; 30 pages.
USPTO; Non-Final Office Action issued in U.S. Appl. No. 16/293,269, dated Jan. 24, 2020; 15 pages.
USPTO; Non-Final Office Action issued in U.S. Appl. No. 16/826,001, dated Nov. 6, 2020; 25 pages.
USPTO; Notice of Allowance issued in U.S. Appl. No. 16/219,883, dated Nov. 7, 2019; 10 pages.
USPTO; Notice of Allowance issued in U.S. Appl. No. 16/293,269, dated Jul. 29, 2020; 5 pages.
USPTO; U.S. Appl. No. 17/076,739, filed Oct. 21, 2020; 67 pages.
Wikipedia, "PCI Express," Published (2019); available online at https://en.wikipedia.org/wiki/PCI_Express.
USPTO; Non-Final Office Action issued in U.S. Appl. No. 17/076,739, dated Oct. 4, 2021; 47 pages.
USPTO; Notice of Allowance issued in U.S. Appl. No. 16/826,001, dated Sep. 22, 2021; 32 pages.

* cited by examiner

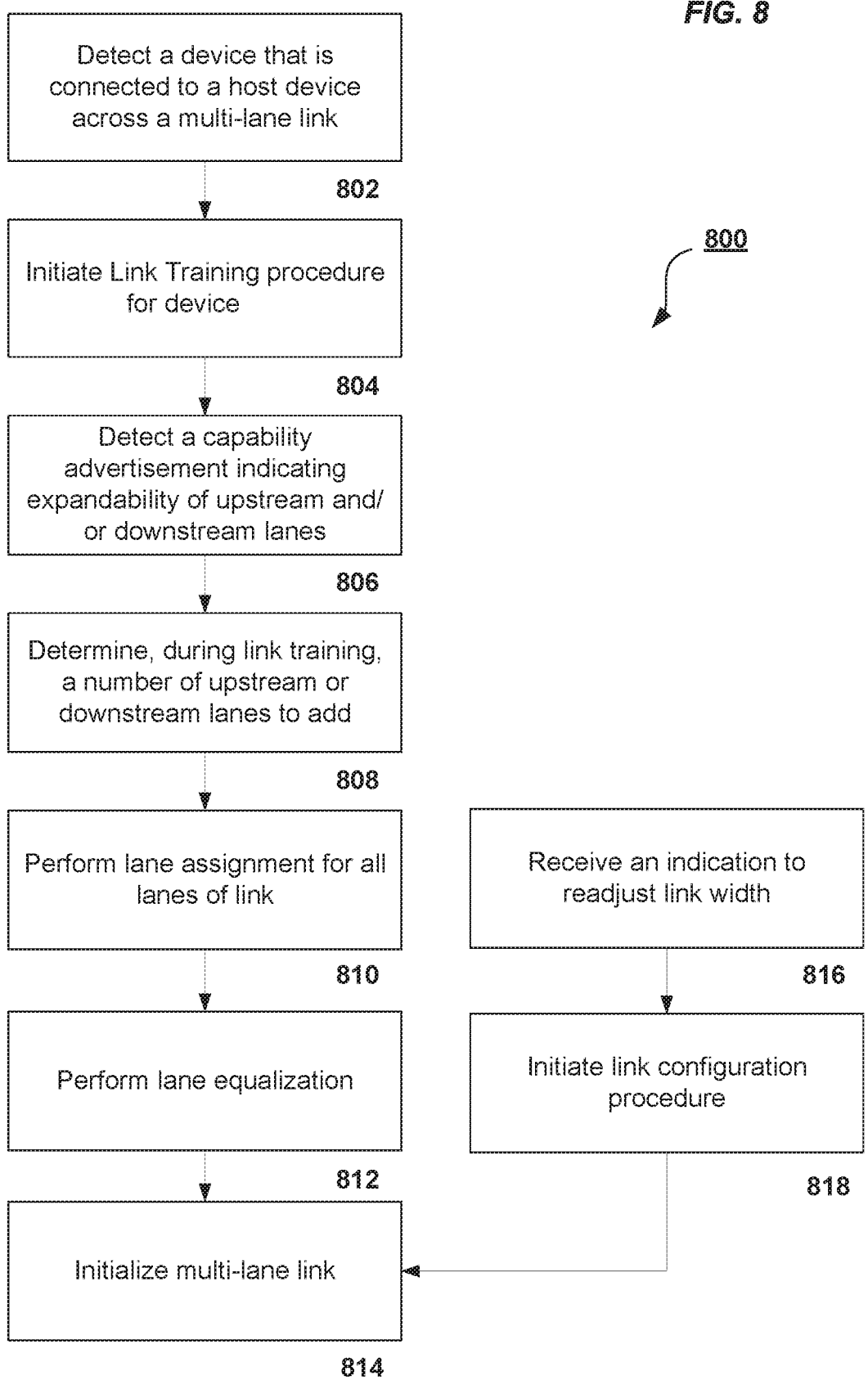

NEGOTIATING ASYMMETRIC LINK WIDTHS DYNAMICALLY IN A MULTI-LANE LINK

BACKGROUND

Interconnects can be used to provide communication between different devices within a system, some type of interconnect mechanism is used. One typical communication protocol for communications interconnects between devices in a computer system is a Peripheral Component Interconnect Express (PCI Express™ (PCIe™)) communication protocol. This communication protocol is one example of a load/store input/output (I/O) interconnect system. The communication between the devices is typically performed serially according to this protocol at very high speeds.

BRIEF DESCRIPTION OF THE DRAWINGS

FIG. 8 is a process flow diagram for negotiating asymmetric link widths dynamically in a multi-lane link in accordance with embodiments of the present disclosure.

DETAILED DESCRIPTION

Figure 1:
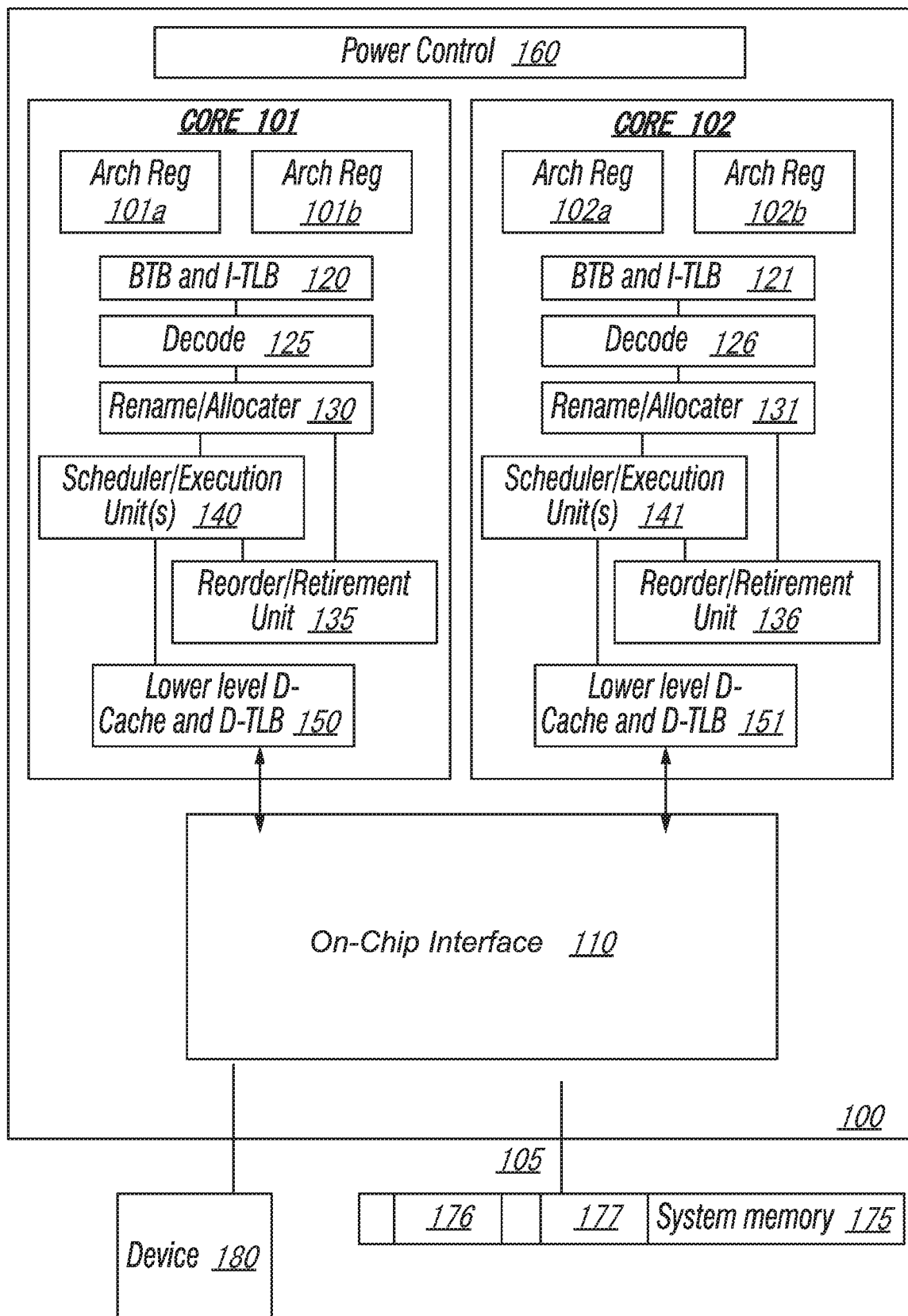
FIG. 1 illustrates an embodiment of a block diagram for a computing system including a multicore processor.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present disclosure.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the disclosure described herein.

Referring to FIG. 1, an embodiment of a block diagram for a computing system including a multicore processor is depicted. Processor 100 includes any processor or processing device, such as a microprocessor, an embedded processor, a digital signal processor (DSP), a network processor, a handheld processor, an application processor, a co-processor, a system on a chip (SOC), or other device to execute code. Processor 100, in one embodiment, includes at least two cores—core 101 and 102, which may include asymmetric cores or symmetric cores (the illustrated embodiment). However, processor 100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores—core 101 and 102. Here, core 101 and 102 are considered symmetric cores, i.e., cores with the same configurations, functional units, and/or logic. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 101 are described in further detail below, as the units in core 102 operate in a similar manner in the depicted embodiment.

As depicted, core 101 includes two hardware threads 101*a* and 101*b*, which may also be referred to as hardware thread slots 101*a* and 101*b*. Therefore, software entities, such as an operating system, in one embodiment potentially view processor 100 as four separate processors, i.e., four logical processors or processing elements capable of executing four software threads concurrently. As alluded to above, a first thread is associated with architecture state registers 101*a*, a second thread is associated with architecture state registers 101*b*, a third thread may be associated with architecture state registers 102*a*, and a fourth thread may be associated with architecture state registers 102*b*. Here, each of the architecture state registers (101*a*, 101*b*, 102*a*, and 102*b*) may be referred to as processing elements, thread slots, or thread units, as described above. As illustrated, architecture state registers 101*a* are replicated in architecture state registers 101*b*, so individual architecture states/contexts are capable of being stored for logical processor 101*a* and logical processor 101*b*. In core 101, other smaller resources, such as instruction pointers and renaming logic in allocator and renamer block 130 may also be replicated for threads 101*a* and 101*b*. Some resources, such as re-order buffers in reorder/retirement unit 135, ILTB 120, load/store buffers, and queues may be shared through partitioning. Other resources, such as general purpose internal registers, page-table base register(s), low-level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, core 101 includes a simplified, representative out-of-order (OOO) processor core. But an in-order processor may be utilized in different embodiments. The 000 core includes a branch target buffer 120 to predict branches to be executed/taken and an instruction-translation buffer (I-TLB) 120 to store address translation entries for instructions.

Core 101 further includes decode module 125 coupled to fetch unit 120 to decode fetched elements. Fetch logic, in one embodiment, includes individual sequencers associated with thread slots 101*a*, 101*b*, respectively. Usually core 101 is associated with a first ISA, which defines/specifies instructions executable on processor 100. Often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific instructions, such as transactional instruction. As a result of the recognition by decoders 125, the architecture or core 101 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 126, in one embodiment, recognize the same ISA (or a subset thereof). Alternatively, in a heterogeneous core environment, decoders 126 recognize a second ISA (either a subset of the first ISA or a distinct ISA).

In one example, allocator and renamer block 130 includes an allocator to reserve resources, such as register files to store instruction processing results. However, threads 101*a* and 101*b* are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 101 and 102 share access to higher-level or further-out cache, such as a second level cache associated with on-chip interface 110. Note that higher-level or further-out refers to cache levels increasing or getting further way from the execution unit(s). In one embodiment, higher-level cache is a last-level data cache—last cache in the memory hierarchy on processor 100—such as a second or third level data cache. However, higher level cache is not so limited, as it may be associated with or include an instruction cache. A trace cache—a type of instruction cache—instead may be coupled after decoder 125 to store recently decoded traces. Here, an instruction potentially refers to a macro-instruction (i.e. a general instruction recognized by the decoders), which may decode into a number of micro-instructions (micro-operations).

In the depicted configuration, processor 100 also includes on-chip interface module 110. Historically, a memory controller, which is described in more detail below, has been included in a computing system external to processor 100. In this scenario, on-chip interface 11 is to communicate with devices external to processor 100, such as system memory 175, a chipset (often including a memory controller hub to connect to memory 175 and an I/O controller hub to connect peripheral devices), a memory controller hub, a northbridge, or other integrated circuit. And in this scenario, bus 105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 175 may be dedicated to processor 100 or shared with other devices in a system. Common examples of types of memory 175 include DRAM, SRAM, non-volatile memory (NV memory), and other known storage devices. Note that device 180 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 100. For example in one embodiment, a memory controller hub is on the same package and/or die with processor 100. Here, a portion of the core (an on-core portion) 110 includes one or more controller(s) for interfacing with other devices such as memory 175 or a graphics device 180. The configuration including an interconnect and controllers for interfacing with such devices is often referred to as an on-core (or un-core configuration). As an example, on-chip interface 110 includes a ring interconnect for on-chip communication and a high-speed serial point-to-point link 105 for off-chip communication. Yet, in the SOC environment, even more devices, such as the network interface, co-processors, memory 175, graphics processor 180, and any other known computer devices/interface may be integrated on a single die or integrated circuit to provide small form factor with high functionality and low power consumption.

In one embodiment, processor 100 is capable of executing a compiler, optimization, and/or translator code 177 to compile, translate, and/or optimize application code 176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

PCIe supports hot plug functionality, but can lack a consistent way to report certain key bits of information to system software, making it difficult for PCIe subsystems to be managed optimally, and leading to system limitations and poor user experiences. These same limitations affect Converged Input/Output (CIO) or "open" Thunderbolt because these I/O configurations use PCIe as a tunneled I/O architecture.

CIO is a tunnel for PCIe and DisplayPort. A CIO link can be of a single lane or two lanes aggregated, running at 10 Gbps to 40 Gbps, or beyond. CIO can operate across a USB Type-C connector (as an alternate mode) and enables PCIe devices outside of the system box.

Figure 2:
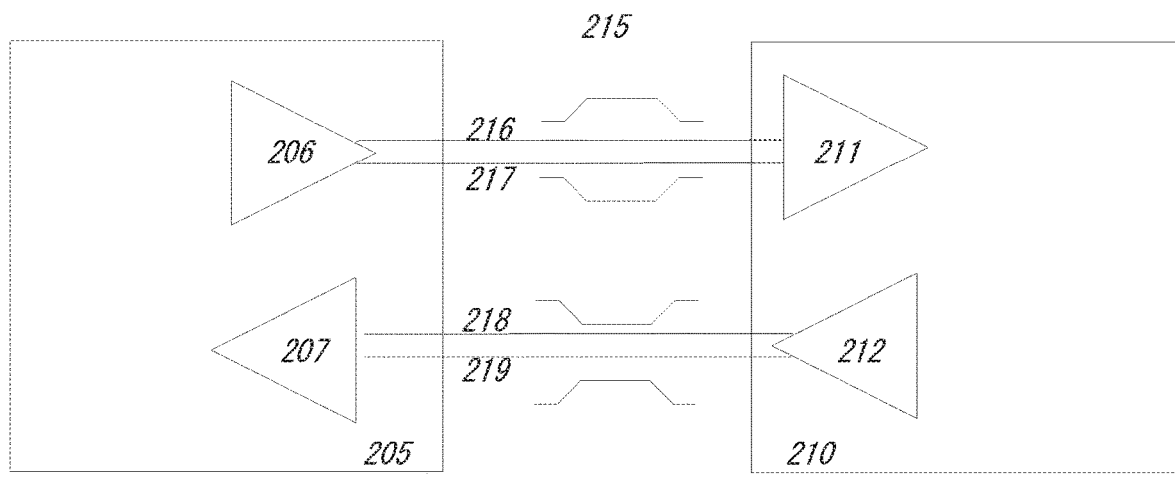
FIG. 2 illustrates an embodiment of a transmitter and receiver pair for an interconnect architecture.

Referring next to FIG. 2, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 206/211 and a receive pair 212/207. Accordingly, device 205 includes transmission logic 206 to transmit data to device 210 and receiving logic 207 to receive data from device 210. In other words, two transmitting paths, i.e. paths 216 and 217, and two receiving paths, i.e. paths 218 and 219, are included in a PCIe link.

A connection between two devices, such as device 205 and device 210, is referred to as a link, such as link 215. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider. A transmitting or receiving path refers to any path for transmitting or receiving data, such as a transmission line, a copper line, an optical line, a wireless communication channel, an infrared communication link, or other communication path. In FIG. 2, one lane is illustrated and includes transmitting paths 216 and 217 and receiving paths 218 and 219. In this application, transmitting paths are also referred to as TX lines; and receiving paths are also referred to as RX lines.

A differential pair refers to two transmission paths, such as paths 216 and 217, to transmit differential signals. As an example, when path 216 toggles from a low voltage level to a high voltage level, i.e. a rising edge, path 217 drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

Each lane in a link can include one or more paths or signaling channels. In some implementations, differential signaling may be used and the signaling channel may include one or more differential signaling pairs. In some implementations, such as PCIe-based interconnects, a lane of a link may be defined, by default, to have at least one differential signaling pair that is initially configured for transmitting data from a first device 205 to a second device 210 and at least one additional differential signaling pair that is initially configured for receiving data at the first device 205 from the second device 210, such that the lane facilitates bidirectional communication between the first and second devices.

Reconfiguration of the lane, such as discussed herein, however, may cause a single lane to be reconfigured into one or more unidirectional lanes, among other configurations. Additionally, a link may include multiple channels or lanes to increase the overall potential bandwidth capable of being carried on the link. In some implementations of a multi-channel link, the link may be initially configured to have an equal number of transmit and receive channels. Additionally, the physical lines used to implement each of the channels may likewise be balanced, such that an equal or otherwise comparable number of physical lines is included in each channel, among other example implementations.

In some computing systems, with interfaces that allow multiple protocols to coexist, many applications use asymmetrical bandwidth allocation. In some cases, outbound (or downstream) bandwidth is greater than inbound (or upstream) bandwidth, such as in display applications where data is transmitted from a central processing system to a display device, such as a monitor. In some cases, the upstream bandwidth is greater than the downstream bandwidth. When the total bandwidth of the I/O interface is limited, certain lanes are underutilized, while others are oversubscribed. This disclosure describes dynamically switching between a symmetric interface to an asymmetric interface without impacting current traffic. The systems, methods, and devices described herein can keep the flow of events intact and can use available bandwidth pathways, without impacting the user experience.

Multi-lane interconnects such as PCIe, UltraPath Interconnect (UPI), Thunderbolt (TBT, and other converged IO (CIO)), etc. are symmetric links. That is, for an x4 link, 4 lanes can be configured to be upstream lanes and 4 lanes can be configured to be downstream lanes. There are a number of emerging applications where the bandwidth demand is asymmetric or can change dynamically over time. For example, a central processing unit (CPU) connected to a memory drive (MD) may use more bandwidth in the inbound (from MD to CPU) direction than outbound direction because in the MD application, reads are more frequent than writes and a write involves a read prior to the write operation. Asymmetric link widths can support serialized-deserialized (SERDES)-based differential DIMM or memory drive-type interconnects, based on PCIe PHY. This disclosure facilitates an asymmetric link configuration, in which some lanes can be bidirectional lanes. For example, a bidirectional lane can operate as two independent unidirectional lanes by converting a transmission-reception (TX-RX) pair to an RX-TX pair or vice-versa). The disclosure also describes changing the number of lanes in each direction dynamically, depending on the bandwidth demand of the applications. The systems, methods, and computer program products described herein can be applied to PCIe-based interconnects, as well as other types of interconnects, and are also applicable to links interconnecting retimers.

This disclosure describes systems, methods, and devices for changing the direction of one or more transmission paths of a multi-lane link on a per-lane basis, depending on, among other things, the work-load and whether each hardware element can support such directional changes.

Figure 3:
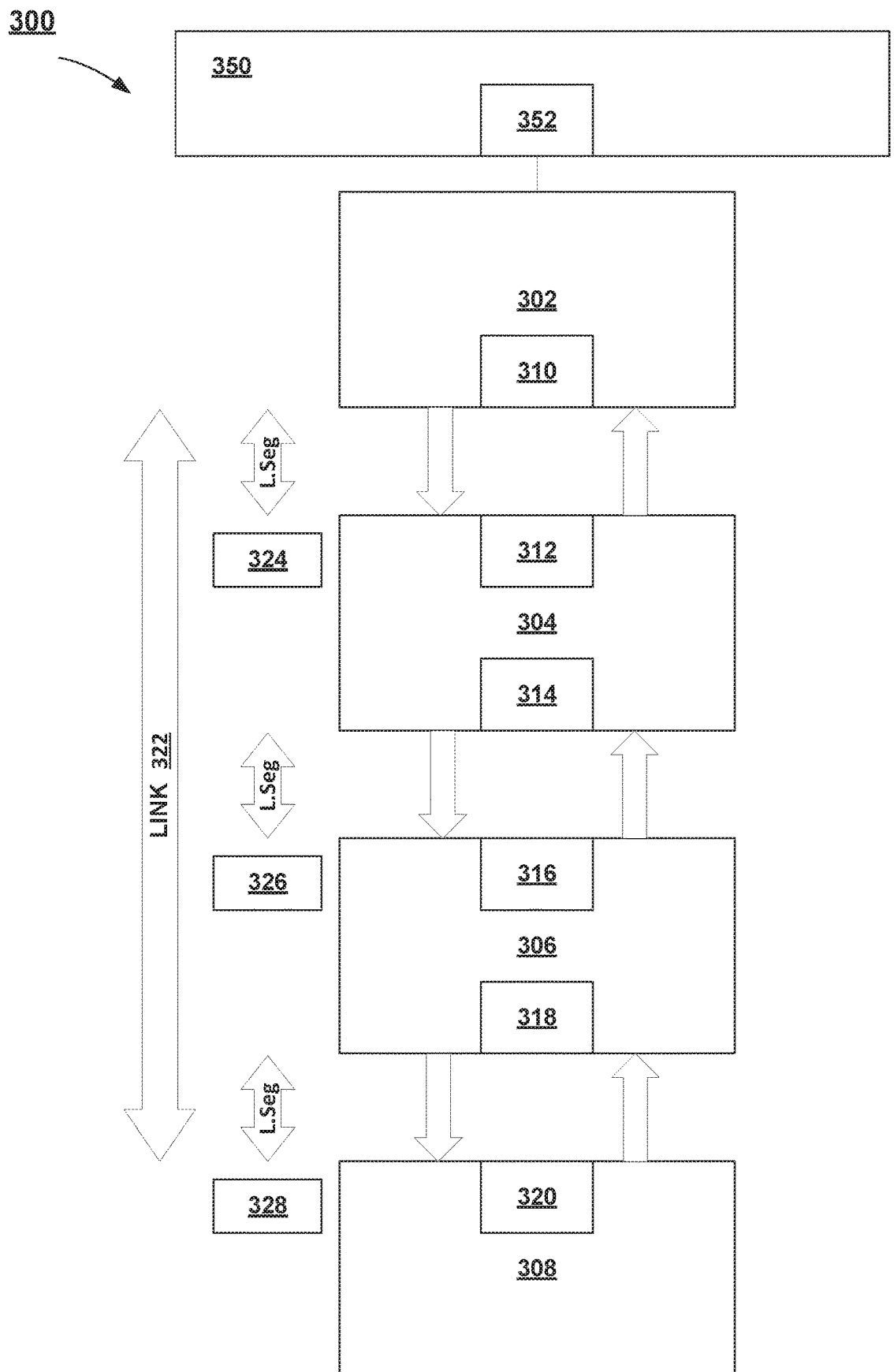
FIG. 3 is a schematic diagram of an example peripheral component interconnect express (PCIe) link architecture in accordance with embodiments of the present disclosure.

FIG. 3 is a schematic diagram of an example peripheral component interconnect express (PCIe) link architecture 300 in accordance with embodiments of the present disclosure. The PCIe link architecture 300 includes a first component 302, which can be an upstream component, root complex, or switch compliant with the PCIe protocol. The first component 302 can include a downstream port 310 that facilitates communications with upstream components across a link 322, such as a link compliant with the PCIe protocol. The first component 302 can be coupled to a second component 308, which can be a downstream component, endpoint, or switch compliant with the PCIe protocol. In some embodiments, the first component can be linked to one or more intermediate components, such as first retimer 304 and second retimer 306, for example.

In embodiments, the first component 302 can include a downstream port 310 to facilitate downstream communications (e.g., towards the second component 308) with the second component 308 (if directly connected) or with the upstream (pseudo) port 312 of retimer 304. The second component 308 can include an upstream port 320 to facilitate upstream communications (e.g., towards the first component 302) with the first component 302 (if directly connected) or with the downstream (pseudo) port 312 of retimer 304.

In the example shown in FIG. 3, the first component 302 can be linked to a first retimer 304 by a first link segment 324. Likewise, the first retimer 304 can be linked to a second retimer 306 by a link segment 326. The second retimer 306 can be linked to the second component 308 by a link segment 328. Link segments 324, 326, and 328 can make up all or a portion of link 322.

The link 322 can facilitate upstream and downstream communications between the first component 302 and the second component 308. In embodiments, upstream communications refers to data and control information transmitted from the second component 308 towards the first component 302; and downstream communications refers to data and control information transmitted from the first component 302 towards the second component 308. As mentioned above, one or more retimers (e.g., retimers 304 and 306) can be used to extend the range of the link 322 between the first component 302 and the second component 308.

A link 322 incorporating one or more retimers (e.g., retimers 304, 306) can form two or more separate electrical sub-links at data rates comparable to data rates realized by links employing similar protocols but with no retimers. For instance, if link 322 included a single retimer, the link 322 could form a link with two separate sub-links, each operating at 8.0 GT/s or higher. As shown in FIG. 3, multiple retimers 304, 306 can be utilized to extend link 322. Three link segments 322, 324, and 326 can be defined through the two retimers 304, 306, with a first sublink 322 connecting the first component 302 to the first retimer 304, a second sublink 324 connecting the first retimer 304 to the second retimer 306, and the third sublink 326 connecting the second retimer 306 to the second component 308.

As shown in the example FIG. 3, in some implementations, a retimer can include two ports (or pseudo ports), and the ports can determine their respective downstream/upstream orientation dynamically. In embodiments, retimer 304 can include an upstream port 312 and a downstream port 314. Likewise, retimer 306 can include an upstream port 316 and a downstream port 318. Each retimer 304, 306 can have an upstream path and a downstream path. Further, retimers 304, 306 can support operating modes including a forwarding mode and an executing mode. A retimer 304, 306 in some instances can decode data received on the sub-link and re-encode the data that it is to forward downstream on its other sublink. As such, retimers may capture the received bit stream prior to regenerating and re-transmitting the bit stream to another device or even another retimer (or redriver or repeater). In some cases, the retimer can modify some values in the data it receives, such as when processing and forwarding ordered set data. Additionally, a retimer can potentially support any width option as its maximum width, such as a set of width options defined by a specification such as PCIe.

As data rates of serial interconnects (e.g., PCIe, UPI, USB, etc.) increase, retimers are increasingly used to extend the channel reach. Multiple retimers can be cascaded for even longer channel reach. It is expected that as signal speeds increase, channel reach will typically decrease as a general matter. Accordingly, as interconnect technologies accelerate, the use of retimers may become more common. As an example, as PCIe Gen-4, with its 16 GT/s, is adopted in favor of PCIe Gen-3 (8 GT/s), the use of retimers in PCIe interconnects may increase, as may be the case in other interconnects as speeds increase.

The downstream port 310 (e.g., in the first component 302, which can be an upstream component, such as a Root Complex or switch) is accessible to system software prior to link establishment or when the link 322 is unable to function properly. In embodiments, registers, such as the link capability registers, can be set to perform clock mode selection in the downstream port 310. System firmware/software can configure the downstream port 310 into the expected mode, and if a change is needed that this will be done by system firmware/software, rather than by hardware.

In embodiments, the link architecture 300 can include a controller hub 350. The controller hub 350 can be part of a root complex, central processing core, or other controller logic of a host system. The controller hub can include a system manager 352. The system manager 352 can be implemented in hardware circuitry and/or in software, such as by system management software embodied in a non-transitory computer-readable medium. For example, the system manager can be implemented as a software manager, hardware circuitry (e.g., protocol stack circuitry), firmware (e.g., of the data processor), or some combination of these. The system manager 352 can include a CIO connection manager, a PCIe connection manager, a USB connection manager, or other connection management logic that can build up and/or tear down connections of downstream devices that are connected across a multi-lane link (such as a link based on the PCIe, USB, or CIO protocols).

The system manager can use a register interface to configure the upstream and downstream lanes to set up an asymmetrical link interface between the host device (e.g., upstream device 302 and/or any intervening retimers 304, 306) and the downstream connected device (308). The system manager can use register information advertised by the downstream connected device 308 to determine whether the downstream connected device includes an interface port that can handle additional lanes of upstream or downstream traffic. Likewise, the system manager can use register information from retimers to determine whether any intervening retimers 304, 306 can support more than the standard number up uplink or downlink lanes. The upstream port 310 of the upstream component 302 should also be configured to support multiple upstream and/or downstream lanes to support asymmetrical interfaces. If all components include ports that can support asymmetrical interfaces, then the system manager can configure the ports and corresponding lanes to be in an asymmetric configuration (e.g., through a register interface on the upstream component 302, the downstream component 308, and any intervening retimers 304, 306).

Figure 4A:
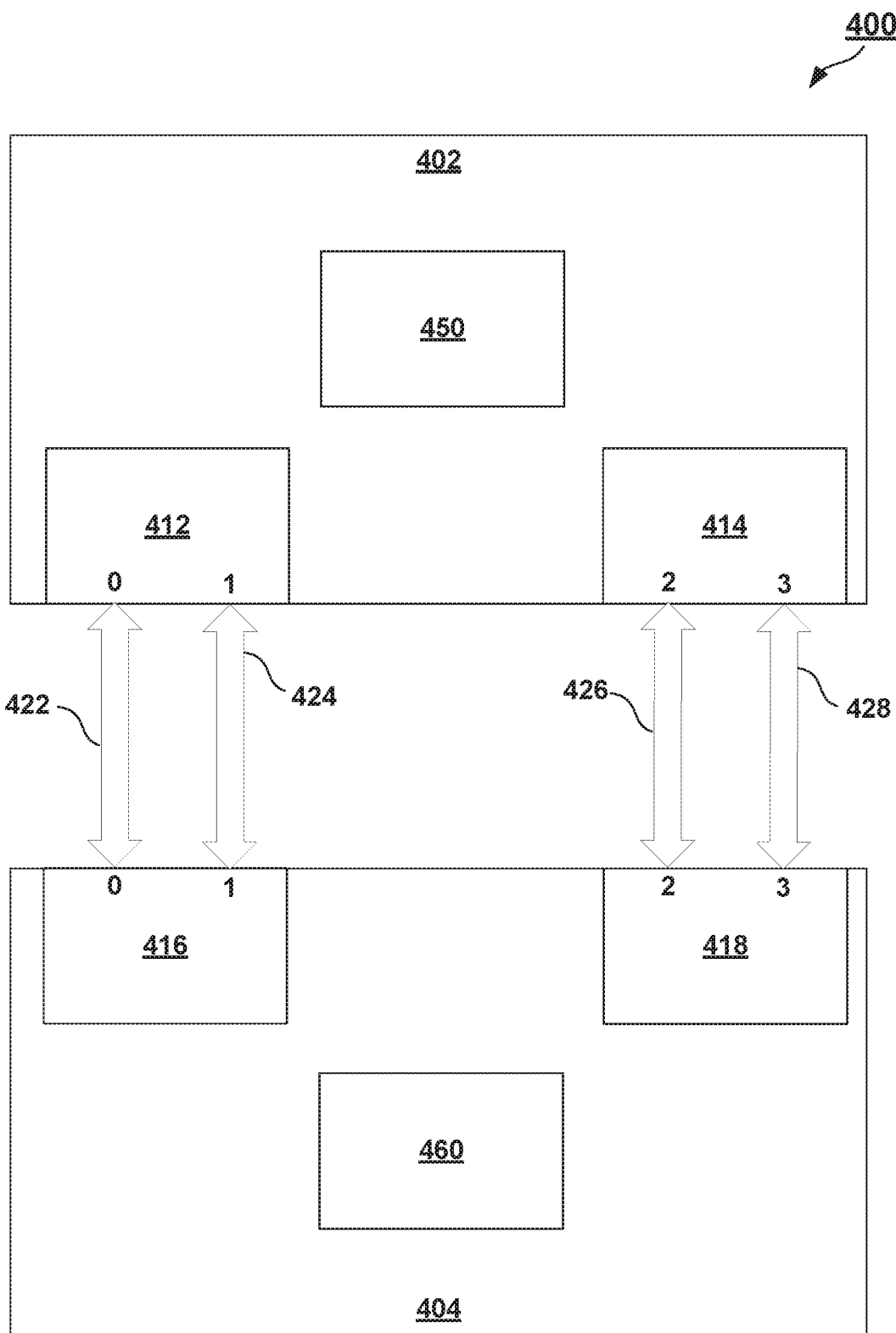
FIG. 4A is a schematic diagram of an example multi-lane interconnect architecture in accordance with embodiments of the present disclosure.
Figure 4B:
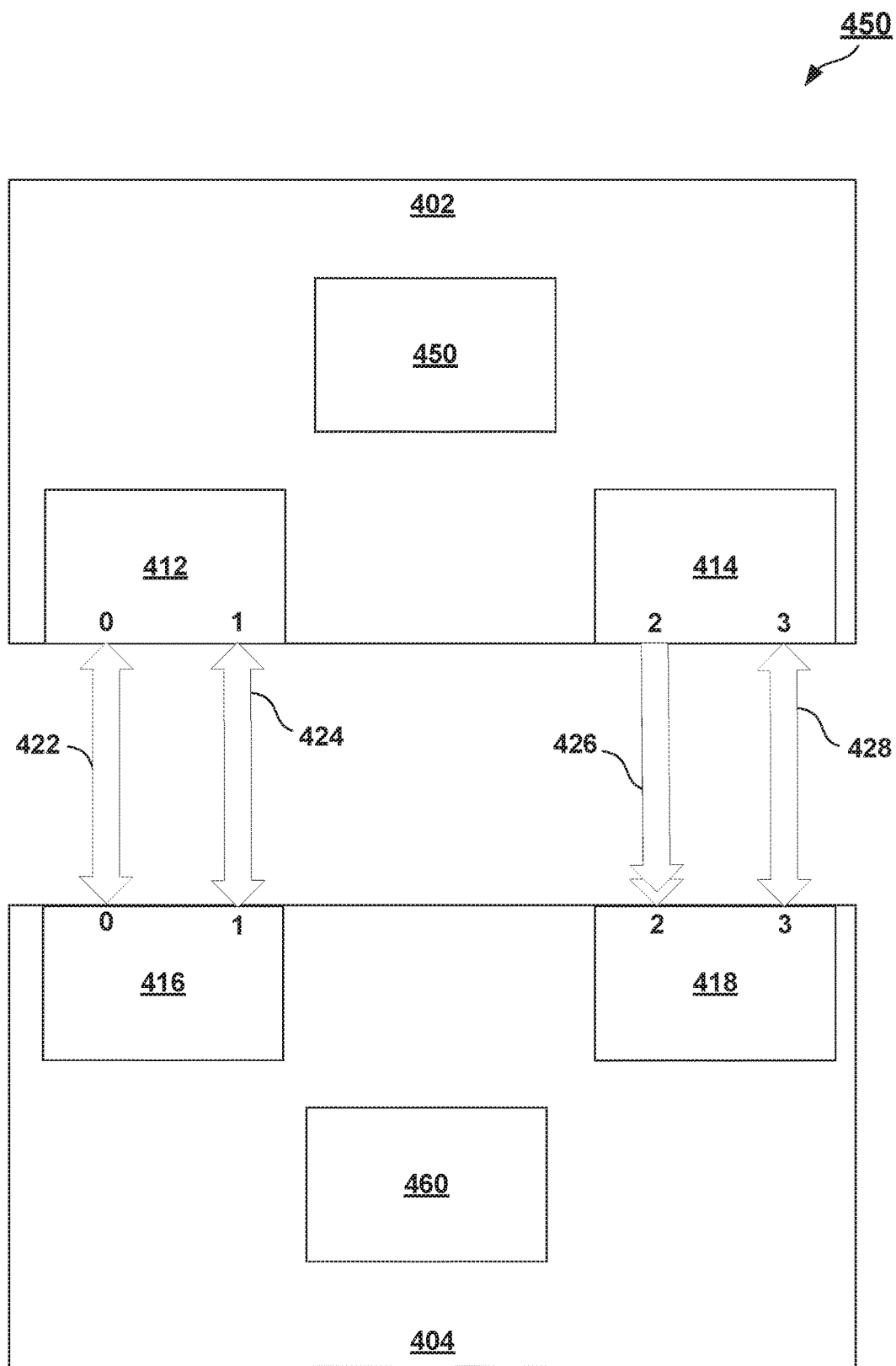
FIG. 4B is a schematic diagrams of example lane direction switching in accordance with embodiments of the present disclosure.

FIG. 4A is a schematic diagram of an example multi-lane interconnect architecture 400 in accordance with embodiments of the present disclosure. Thought the systems and methods described herein can be applied to any number of total or switching lanes, FIGS. 4A and 4B illustrate four lanes with one switched lane for explanation purposes. The multi-lane interconnect architecture 400 can include an upstream component 402. The upstream component 402 can be similar to upstream component 302 of FIG. 3. The upstream component 402 can include a first downstream port 412 and a first upstream port 414. The multi-lane interconnect architecture 400 can also include a downstream component 404. The downstream component 404 can be similar to downstream component 308. The downstream component 404 can include a second downstream port 416 and a second upstream port 418. The first downstream port 412 can be coupled to the second downstream port 416 by a downstream link that includes lane 0 and lane 1. The first upstream port 414 can be coupled to the second upstream port 418 by an upstream link that includes lane 2 and lane 3.

The first downstream port 412, the first upstream port 414, the second downstream port 416 port, and the second upstream port 418 can include logic circuitry and software that can support a switch in the traffic direction.

For example, upstream component 402 can include a controller 450 that includes logic implemented in one or both of hardware or software for switching the direction of one or more lanes of the multi-lane interconnect architecture 400. The controller 450 can also control one or more ports to accommodate for the increase (or decrease) in data traffic. The downstream component 404 can also include a controller 460, that can be similar to controller 450, that includes logic implemented in one or both of hardware or software. Controller 460 can control one or more ports in the downstream component 404 to accommodate an increase or decrease in data traffic through the respective port(s).

The controller 450 can be or can include a system manager. The system manager can be, for example, a CIO connection manager, a PCIe connection manager, or other type of system management software for managing the link directions of the multi-lane interconnect architecture. The system management software can use one or more parameters to determine that the port(s) can accommodate the increase in data traffic entering or exiting a port. The system manager can use register settings or a capabilities advertisement to determine that a change in the line direction is supported by both the upstream component 402 and the downstream component 404 (and any intervening retimers). For example, the system manager can set a register in the upstream component 402 and/or in the downstream component 404 to cause each component to recognize the change in a line direction. The system manager can also determine whether a respective port can accommodate an increase in traffic. For example, a dedicated downstream port may not be able to accommodate any upstream traffic. The system manager can determine whether the ports can accommodate a line direction switch prior to performing any dynamic line direction switching.

In addition, the system manager can use one or more parameters to determine that the connected components can benefit from asymmetrical link configuration. In some embodiments, the system manager can use bandwidth topology information to dynamically adjust a number of upstream and/or downstream lines to accommodate traffic flows for connected devices that will use more of one type of line (e.g., upstream vs downstream). For example, a monitor may use more downstream lines than upstream lines, while a storage device or video camera may use more upstream lines than downstream lines. If the bandwidth is available on the lines, then the system manager can switch the direction of one or more lines of the multi-lane link to establish the asymmetric interface.

A downstream line can refer to a transmitting path coupling a TX logic at a first device with an RX logic at a second device. An upstream line can refer to a receiving path coupling an RX logic at a first device with a TX logic at a second device.

The multi-lane link architecture 400 illustrates an example interface between two systems: upstream component 402 and downstream component 404. The interface includes four lanes: Lane 0 422, Lane 1 424, Lane 2 426, and Lane 3 428. FIG. 4B is a schematic diagram of example line direction switching in accordance with embodiments of the present disclosure. In the example scenario illustrated in FIGS. 4A and 4B, the multi-lane link is dynamically switched between symmetrical mode to asymmetrical mode (where Lane 0 422, Lane 1 424, and Lane 3 428 remain unchanged, but where lane 2 426 uses two downstream lines, illustrated by two arrows pointing from the upstream component 402 to the downstream component 404).

Figure 5A:
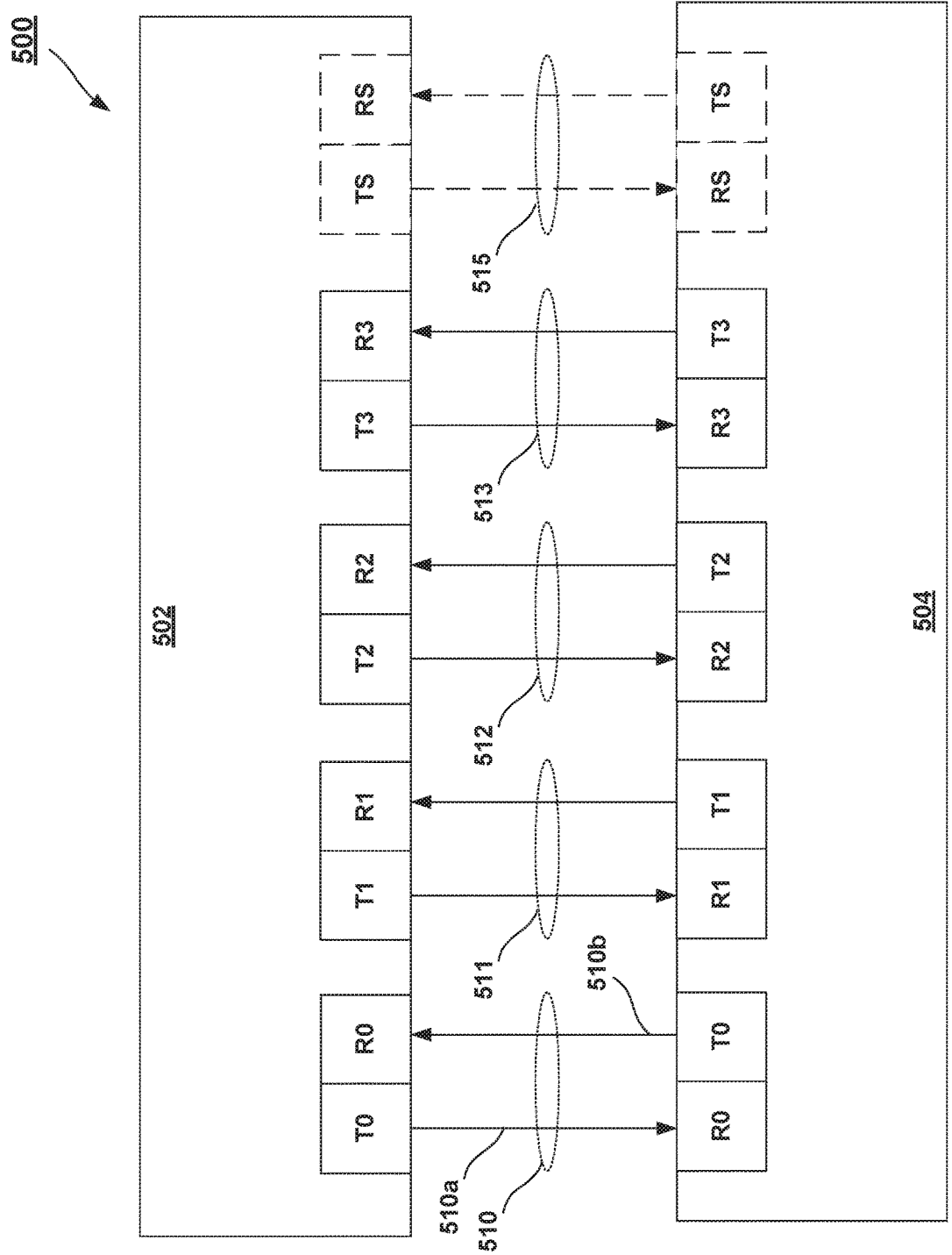
FIG. 5A is a schematic diagram of an example symmetric link topology in accordance with embodiments of the present disclosure.

FIG. 5A is a schematic diagram of an example symmetric link topology 500 in accordance with embodiments of the present disclosure. The symmetric link topology 500 can include a first component 502 and a second component 504. For ease of disclosure, the first component 502 can be an upstream component, such as component 302 of FIG. 3A-B; the second component 504 can be a downstream component, such as component 404. It is understood, however, that the first component can be a downstream component, and the second component can be an upstream component without deviating from the scope of the disclosure.

The first component 502 can be linked to the second component 504 by a plurality of lanes, such as Lane 0 510, Lane 1 511, Lane 2 512, and Lane 3 513. Each lane of the multi-lane link can include a TX line and an RX line. For example, Lane 0 510 includes a TX line 510a and an RX line 510b. In some embodiments, a spare lane Lane S 515 can be used to expand the bandwidth of the multi-lane link. The configuration shown in FIG. 5A is a default lane configuration with 4 (+1 spare) TX lines and 4 (+1 spare) RX lines. For embodiments where the multi-lane link is based on the PCIe protocol, the link in FIG. 5A would be an x4 Link. In this example, the x4 PCIe Link will have 4 Upstream and 4. Downstream Lanes.

For a PCIe multi-lane link, components may advertise the capability to change lane directionality as an optional capability in each lane of each component (including Retimers). More specifically, the first component 502 and the second component 504 can advertise whether one or more TX channels or lines within a channel can act as RX lines and whether one or more RX lines can act as TX lines. Based on the capability indicated by the components, different link width permutations are possible, depending on the usage requirement. For example, the multi-lane link can be configured as 2. Lanes Downstream and 8 lanes Upstream or 8. Lanes Downstream and 2 Lanes Upstream, depending on the workload. Other permutations between lanes are permissible: (Downstream Lane, Upstream Lane): (1, 9), (9, 1), (3, 7), (7, 3), (4, 6), (6, 4), (5, 5). Without the spare Lane, the x4 Link can have the following permutations between (Downstream, Upstream) Lanes: (4, 4), (1, 7), (7, 1), (3, 5), (5, 3), (2, 6), (6, 2). Although for simplicity, at least one lane in each direction is maintained so as to facilitate passing credits, responses, ACK/NACK of transactions etc. In embodiments, however, a single lane can be used bi-directionally by time-multiplexed use of a lane.

Figure 5B:
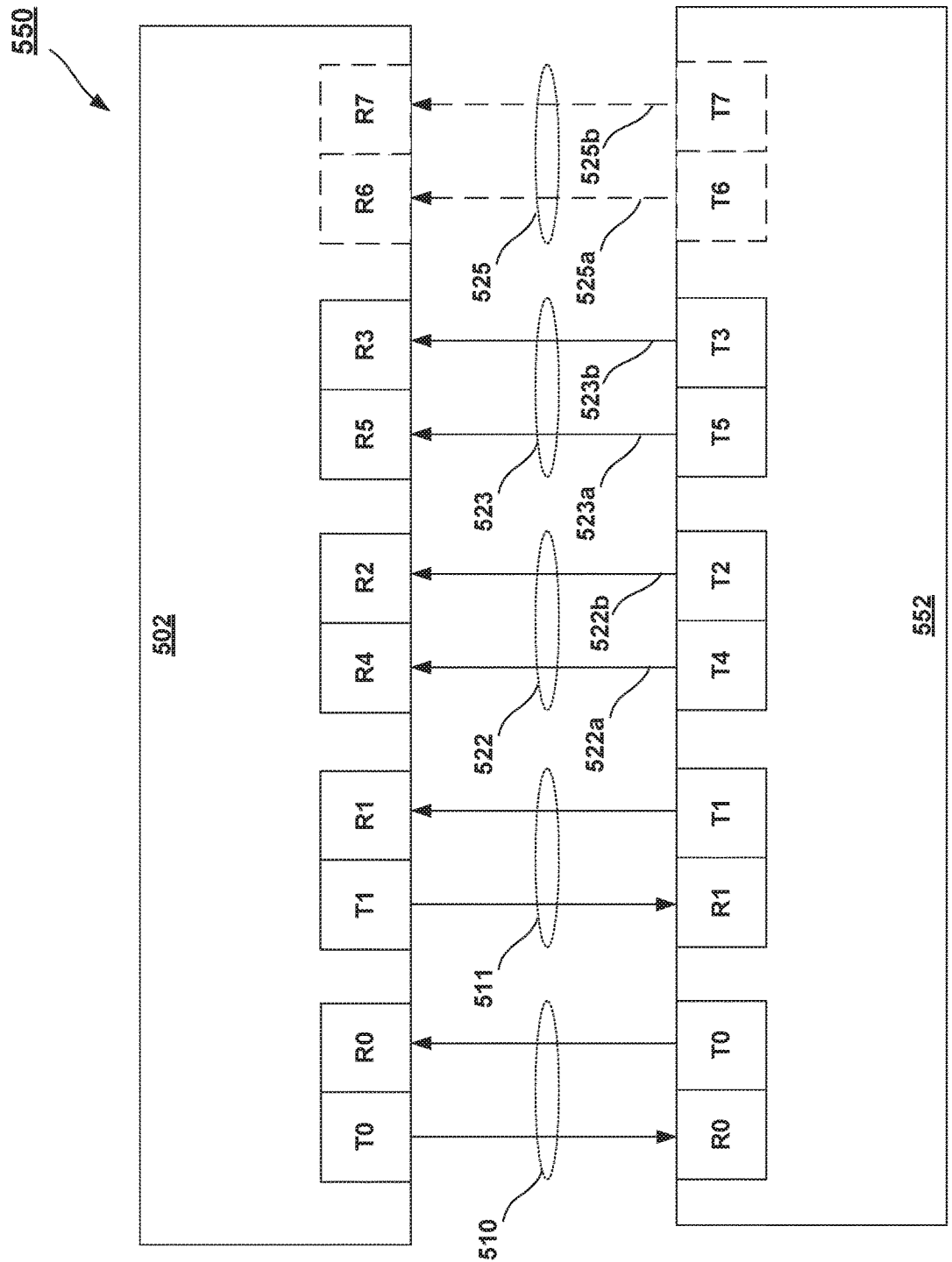
FIG. 5B is a schematic diagram of an example asymmetric link topology in accordance with embodiments of the present disclosure.

FIG. 5B is a schematic diagram of an example asymmetric link topology 550 in accordance with embodiments of the present disclosure. The asymmetric link topology 550 of FIG. 5B includes two lanes (Lane 0 510 and Lane 1 511) that are unchanged from the default setting. The asymmetric link topology 550 includes additional RX lines. Instead of Lane 2 522 including one TX line and one RX line, Lane 2 522 now includes two RX lines (RX line 522a and RX line 522b). Likewise, Lane 3 523 includes two RX lines 523a and 523b, and the spare lane Lane S 525 includes two RX lines 525a and 525b.

In the example of FIG. 5B, the second component can be a downstream component that uses more upstream bandwidth than downstream bandwidth. An example of a downstream device that uses more upstream bandwidth can include a memory device or video camera.

Figure 5C:
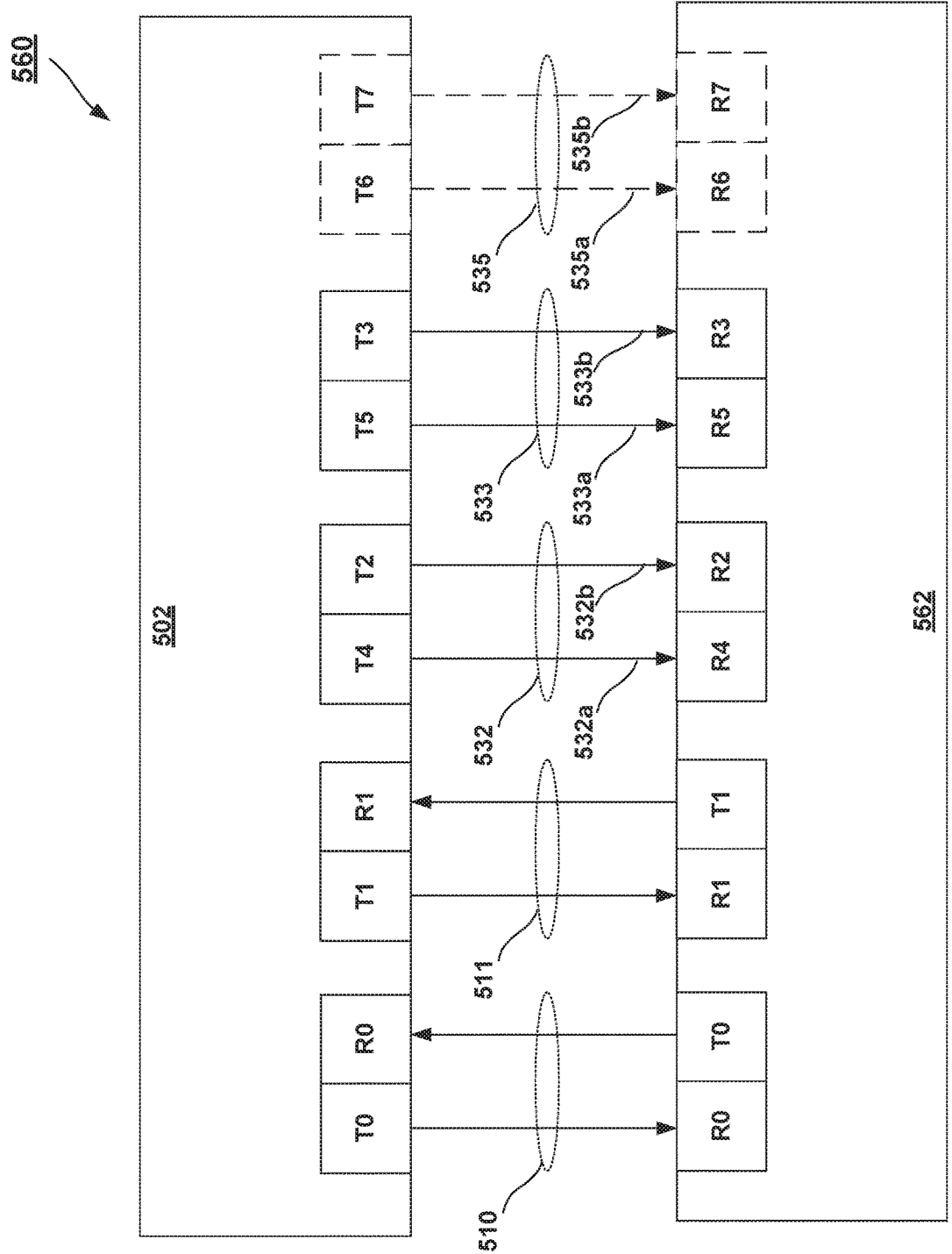
FIG. 5C is a schematic diagram of an example asymmetric link topology in accordance with embodiments of the present disclosure.

FIG. 5C is a schematic diagram of an example asymmetric link topology 560 in accordance with embodiments of the present disclosure. The asymmetric link topology 560 of FIG. 5C includes two lanes (Lane 0 510 and Lane 1 511) that are unchanged from the default setting. The asymmetric link topology 560 includes additional TX lines. Lane 2 532 now includes two TX lines 532a and 532b. Likewise, Lane 3 533 includes two TX lines 533a and 533b, and the spare lane Lane S 535 includes two TX 535a and 535b.

In the example of FIG. 5C, the second component can be a downstream component that uses more downstream bandwidth than upstream bandwidth. An example of a downstream device that uses more downstream bandwidth than upstream bandwidth can include a display device.

Figure 6:
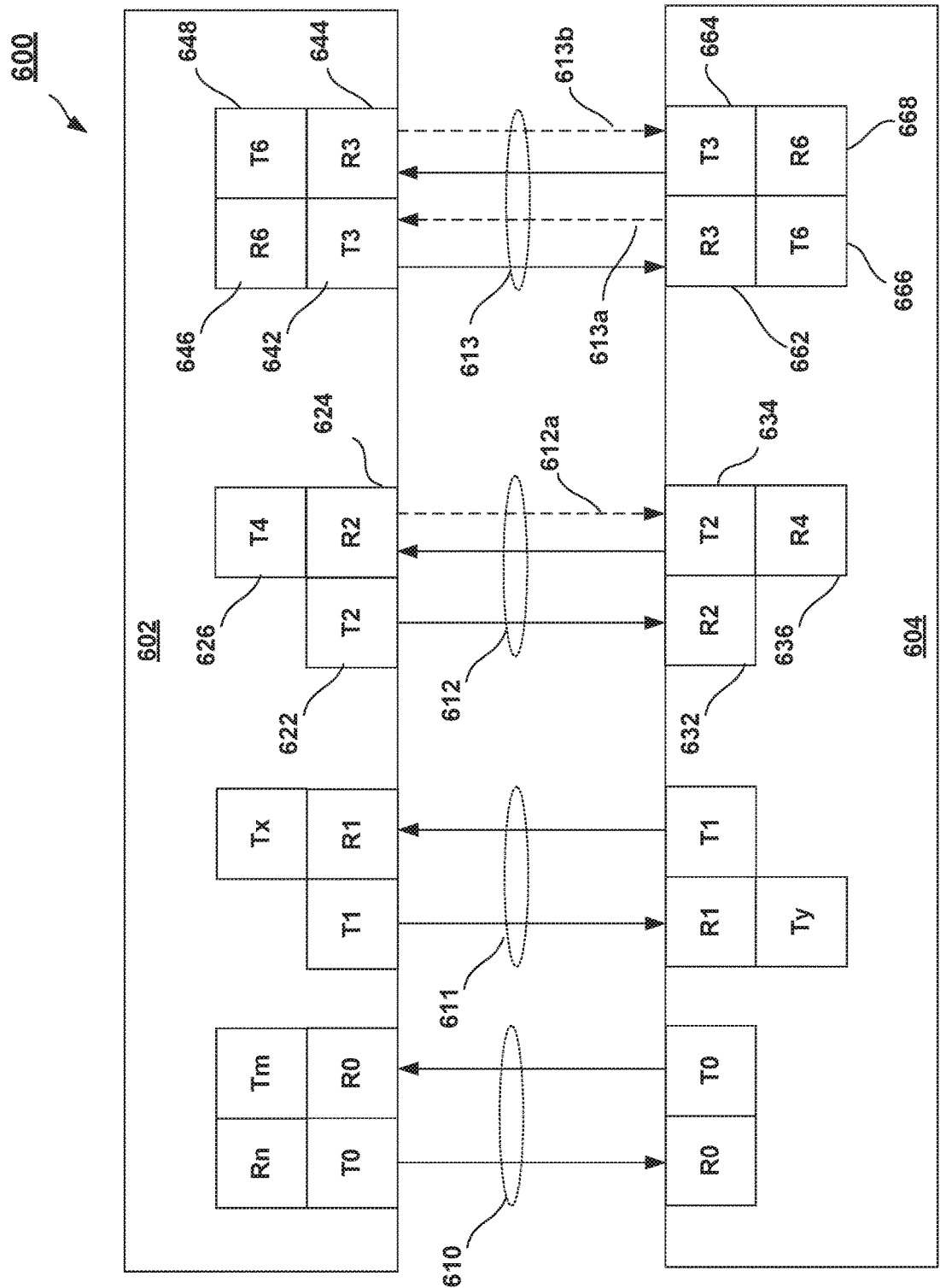
FIG. 6 is a schematic diagram of a variable link width topology illustrating permutations of lane width variability in accordance with embodiments of the present disclosure.

FIG. 6 is a schematic diagram of a variable link width topology 600 illustrating permutations of lane width variability in accordance with embodiments of the present disclosure. Each lane can independently advertise its capability to change direction (e.g., during link training phase, discussed below). Table 1 summarizes the capability of each component on a per lane basis, which is illustrated in FIG. 6. Each of the host and the connected device should support link width variability for a lane direction to be changed.

The topology 600 shows a first component 602 coupled to a second component 604. The first component can be the host device described in Table 1; while the second component can be the connected device of Table 1. As shown in FIG. 6, the multi-lane link is an x4 link that includes 4 lanes: Lane 0 610, Lane 1 611, Lane 2 612, and Lane 3 613.

For Lane 0 610, the first component includes hardware circuitry to support full TX-RX line switching (e.g., both TX and RX lines can be switched). However, the second component does not support lane switching at Lane 0 610. Therefore, link width variability is not support by Lane 0 610.

For Lane 1 611, the first component supports using RX as TX, but the second component only supports using RX as TX. Put simply, both the first component 602 and the second component 604 support using RX lines as TX lines, but neither supports using TX lines as RX lines. Without an additional RX line, the components cannot handle additional reception from an increase in TX lines. Therefore, link width variability is not supported at Lane 1 611.

For Lane 2 612, the first component supports using RX as TX and the second component supports using TX as RX. Therefore, link width variability is supported by Lane 2 612 in the downstream (host→connected device) direction. The additional lane is indicated by the dotted arrow in FIG. 6.

For Lane 3 613, the first and second component each support full link width variability. Therefore, each of the first and second component can handle an additional TX line or and additional RX line. The additional lanes are indicated by dotted arrows in FIG. 6.

TABLE 1

Permutations of Lane Width Variability

| | Lane 0 Tx as Rx? | Lane 0 Rx as Tx? | Lane 1 Tx as Rx? | Lane 1 Rx as Tx? | Lane 2 Tx as Rx? | Lane 2 Rx as Tx? | Lane 3 Tx as Rx? | Lane 3 Rx as Tx? |
|---|---|---|---|---|---|---|---|---|
| Host | Y | Y | N | Y | N | Y | Y | Y |
| Device | N | N | Y | N | Y | N | Y | Y |
| Additional Lane | No | | No | | Only CPU-> Device | | One each direction | |

As a result, Lane 2 612 can form an additional downstream (TX) line 612a from host 602 to device 604. As shown in FIG. 6, the host 602 can include hardware circuitry and accompanying software and/or firmware to support the additional downstream line 612a. The host can include a first transmitter circuit element 622 implemented at least partially in hardware circuitry (labelled T2 during lane number assignment phase of link training). The transmitter circuit element 622 can include a pin electrically connecting a physical line of the multi-lane link with host circuitry. The host 602 can also include a receiver circuit element 624 implemented at least partially in hardware circuitry (which could be labelled R2 during lane number assignment of link training if a reception line is used). The host 602 can also include a fourth transmitter circuit element 624 implemented at least partially in hardware circuitry (and labelled T4 during lane number assignment phase of link training if a second downstream line 612a is to be used). A common pin can be used to connect the device 604 with the receiver circuit element 624 and/or the second transmitter circuit element 626. Other naming conventions and orders are possible and in keeping with the scope of the disclosure.

The connected device 604 can likewise include additional circuitry to facilitate the link width expansion. For example, the connected device 604 can include hardware circuitry and accompanying software and/or firmware to support the additional downstream line 612a. The device 604 can include a first receiver circuit element 632 implemented at least partially in hardware circuitry (labelled R2 during lane number assignment phase of link training). The receiver circuit element 632 can include a pin electrically connecting a physical line of the multi-lane link with host circuitry. The device 604 can also include a first transmitter circuit element 634 implemented at least partially in hardware circuitry (which could be labelled T2 during lane number assignment of link training if an upstream line is used on L2 612). The device 604 can also include a fourth receiver circuit element 634 implemented at least partially in hardware circuitry (and labelled R4 during lane number assignment phase of link training if a second downstream line 612a is to be used). A common pin can be used to connect the host 602 with the receiver circuit element 634 and/or the second transmitter circuit element 636. Other naming conventions and orders are possible and in keeping with the scope of the disclosure.

Lane 3 613 can include additional lane in each direction (downstream line 613*a* or upstream line 613*b*). As shown in FIG. 6, the host 602 can include hardware circuitry and accompanying software and/or firmware to support the additional downstream line 613*a* and the additional upstream line 613*b*. The host 602 can include a third transmitter circuit element 642 implemented at least partially in hardware circuitry (labelled T3 during lane number assignment phase of link training). The host 602 can also include a third receiver circuit element 644 implemented at least partially in hardware circuitry (which could be labelled R3 during lane number assignment of link training if an upstream line is used).

The host 602 can also include a fifth receiver circuit element 646 implemented at least partially in hardware circuitry (and labelled R5 during lane number assignment phase of link training if a second upstream line 613*a* is to be used). A common pin can be used to connect the device 604 with the third transmitter circuit element 642 and/or the fifth receiver circuit element 646. The host 602 can also include a sixth transmitter circuit element 648 implemented at least partially in hardware circuitry (and labelled T6 during lane number assignment phase of link training if a second downstream line 613*b* is to be used). A common pin can be used to connect the device 604 with the third receiver circuit element 644 and/or the sixth transmitter circuit element 648. Other naming conventions and orders are possible and in keeping with the scope of the disclosure.

The connected device 604 can likewise include additional circuitry to facilitate the link width expansion. For example, the connected device 604 can include hardware circuitry and accompanying software and/or firmware to support the additional downstream line 613*a* or 613*b*. The device 604 can include a third receiver circuit element 652 implemented at least partially in hardware circuitry (labelled R3 during lane number assignment phase of link training if a downstream line is used on L3 613). The device 604 can also include a third transmitter circuit element 654 implemented at least partially in hardware circuitry (which could be labelled T3 during lane number assignment of link training if an upstream line is used on L3 613). The device 604 can also include a fifth transmitter circuit element 656 implemented at least partially in hardware circuitry (and labelled T5 during lane number assignment phase of link training if a second upstream line 613*a* is to be used). A common pin can be used to connect the host 602 with the third receiver circuit element 652 or with the fifth transmitter circuit element 656. The device 604 can also include a sixth receiver circuit element 658 implemented at least partially in hardware circuitry (and labelled R6 during lane number assignment phase of link training if a second downstream line 613*b* is to be used). A common pin can be used to connect the host 602 with the third transmitter circuit element 654 or with the sixth receiver circuit element 658. Other naming conventions and orders are possible and in keeping with the scope of the disclosure.

Figure 7A:
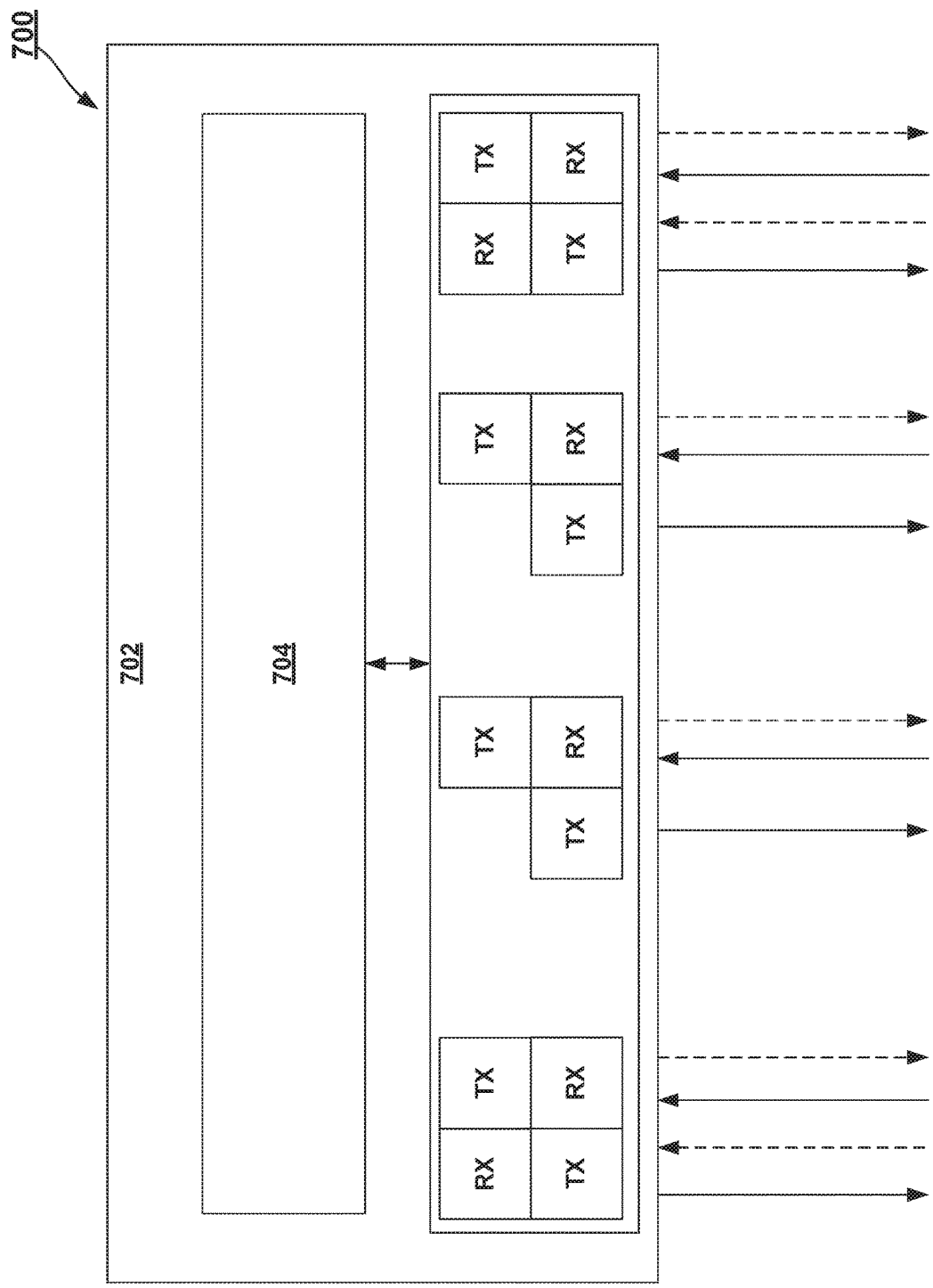
FIG. 7A-7B are schematic diagrams of example logic stack implementations for expanding link width of a multi-lane link in accordance with embodiments of the present disclosure.
Figure 7B:
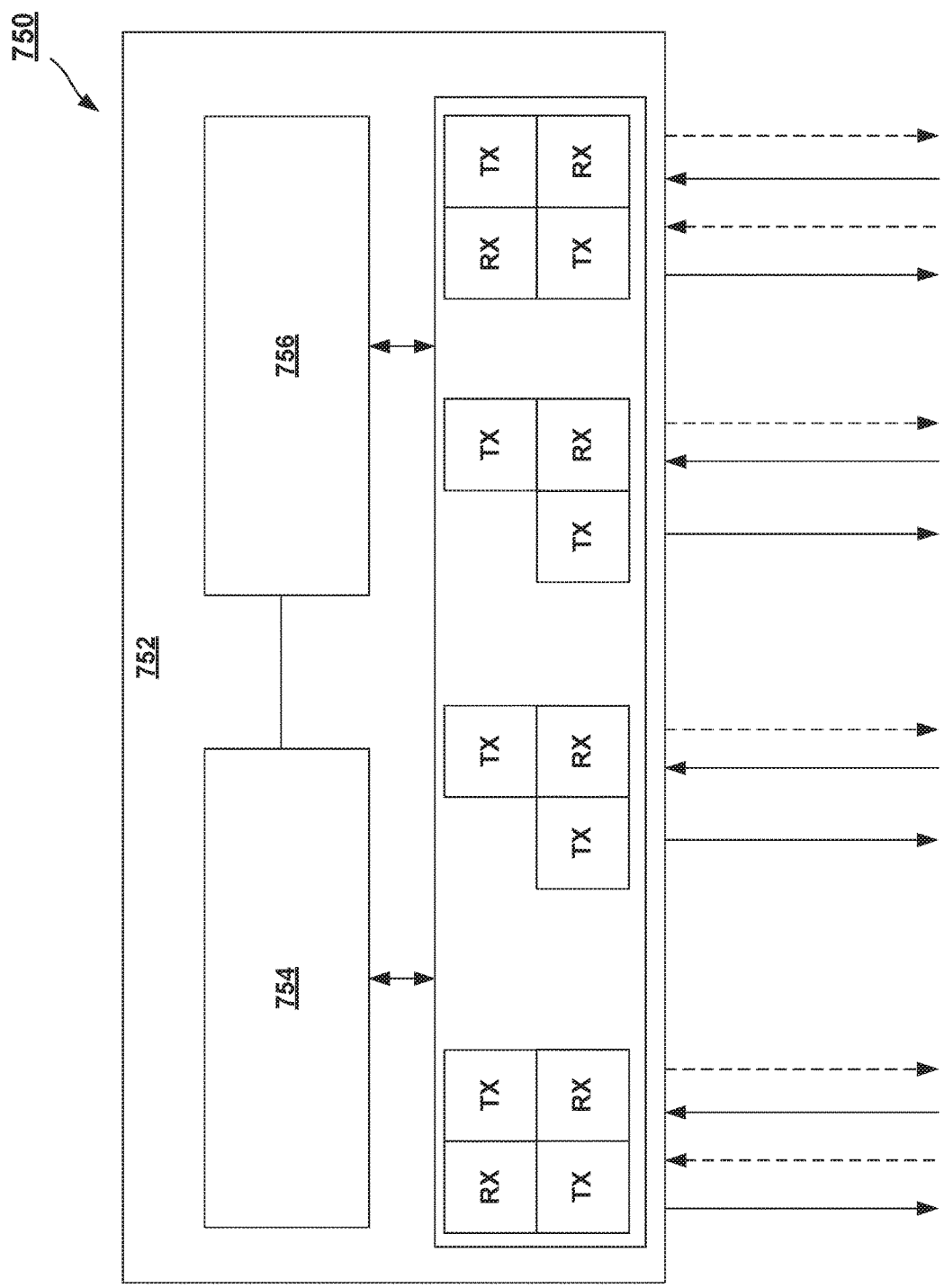

The hardware circuit that can be used in a host or a connected device to expand link widths as described herein can include one or more buffer memory elements (also referred to as logic stacks). FIG. 7A-7B are schematic diagrams of example logic stack implementations for expanding link width of a multi-lane link in accordance with embodiments of the present disclosure.

FIG. 7A is a schematic diagram 700 of an example common logic stack 704 residing at a host device 702 and supporting expanded link width in accordance with embodiments of the present disclosure. The use of a common stack 704 may be beneficial in situations where the bandwidth in each direction is variable. A common stack 704 can be used to handle the widest possible link each direction. In that case, the implementation should have all virtual channels map to the widest possible direction to mimic a single link. In some embodiments, the internal stack may have challenges to deal with a potential bandwidth doubling. For example, PCIe links that can deal with a maximum of 16 Lanes in each direction will have trouble delivering 32 lanes of bandwidth. In those cases, one may choose to implement multiple logic stacks. FIG. 7B is a schematic diagram 750 of an example host 752 that implements multiple logical stacks 754 and 756 in accordance with embodiments of the present disclosure. For example, if an x16 PCIe link becomes effectively x32, the host 752 can use two different x16 stacks 754 and 756. The narrow part (Tx) may be shared/muxed between the two stacks for passing credits back.

FIG. 8 is a process flow diagram 800 for negotiating asymmetric link widths dynamically in a multi-lane link in accordance with embodiments of the present disclosure. At the outset, a host device can detect the presence of a downstream connected device (802). The host device, as part of the link set up, can initiate a link training procedure to train the multi-lane links interconnecting the host to the downstream device (804). The host can detect a capability of the downstream connected device for lane width variability (806). The asymmetric link capability negotiation occurs when the link is training. For example, in PCIe, when the link trains to L0 at 2.5G, each side advertises asymmetric capability on a per-lane basis, including spare lane(s), alternate protocol, EQ. bypass during Config Cycle. The per lane asymmetric capability can be advertised in the modified TS1/TS2 Ordered Sets under "Alternate Protocol Details" field (16 bits) in the regular lanes. Other bit fields of the TS1/TS2 OS can also be used. The following encodings can be used to indicate the asymmetry support on a per-Lane basis: 00: no asymmetry support, 01: only TX can become RX, 10: only RX can become TX, 11: TX can be an RX and RX can be a TX. A Retimer can be expected to override these bits to reflect its capability on that lane combined with whatever the other side supports. For example, if a device advertises "11" in its capability (i.e., TX can be RX and vice-versa) but the Retimer only supports its TX to be RX on that Lane (01), then the Retimer modifies that field to be 01b.

The host device can use the link training to determine how many additional upstream or downstream ports to configure (808). For example, the host can use bandwidth information to determine that the interconnect can support an increased number of lanes in either direction.

The host can perform lane number assignments of the lanes during link training (810). An example of a lane numbering scheme is illustrated in FIG. 6. If spare lanes exist, the spare lanes can be assigned lane numbers by the downstream port (DSP) of the if the downstream port can drive on those lanes. The upstream port (USP) on the can use the increment when it drives. For example, in a x4 Link with 2 spare Lanes, the DSP will use Lane numbers 4, 5, 6, 7 for the spare lanes, if the USP drives it will use the same numbers. The lanes that cannot be driven by DSP, the USP has to provide lane and line numbering consistent with the rest of the TX line numbering.

The lanes can undergo equalization (812). Equalization is performed on all possible TX/RX pairs, including spare lanes. The assumption is that Lane 0 does not change direction (even though it is capable). During Phase 2 of link training (USP requests DSP to adjust its TX settings for the RX set-up), the widest possible Link width in the DSP to USP direction will be equalized and the back channel for the additional Lanes will be conveyed from the Lane 0 which can time-multiplex between the requests for different Lanes. During Phase 3 the reverse happens. Some lanes may equalize twice or thrice but opposite directions between a different (TX, RX) pair. Thus, in FIG. 6, the Link Equalization (EQ) can occur three times for each data rate: a first equalization for the default lane configuration; a second equalization for all the additional upstream lines only; and the third equalization for all downstream lines only.

At the beginning of Phase 2 (3), the Lanes that change direction will be allowed a period of electrical idle for allowing the change in direction. At the conclusion of EQ, on entry to Recovery, the Link will go back to its desired setting with a brief electrical idle to allow direction change on some Lanes, if needed. If Lane 0 also needs to support reversing direction, another round of equalization can be done to equalize in the reversed direction of Lane 0 using another Lane to perform the back-channel equalization.

At any point during link operation, the link width can be adjusted by the host or the device through a register setting indication (816). When a link needs to change the width in any direction, it does so by moving to the configuration state for reconfiguration. The desired width in each direction is exchanged and the width decided. This can be dictated by system software writing to a configuration register to change the desired width in each direction that hardware follows. It can also be done autonomously by hardware based on the projected bandwidth demand in each direction, following a pre-determined algorithm (e.g., the DSP can decide the width depending on its need as well as the bandwidth demand of the USP in a proportionate manner). In embodiments, the link can undergo the link training procedure previously described (818); the multi-lane link can then be initialized (e.g., in a default state) (814).

One interconnect fabric architecture includes the Peripheral Component Interconnect (PCI) Express (PCIe) architecture. A primary goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express.

Figure 9:
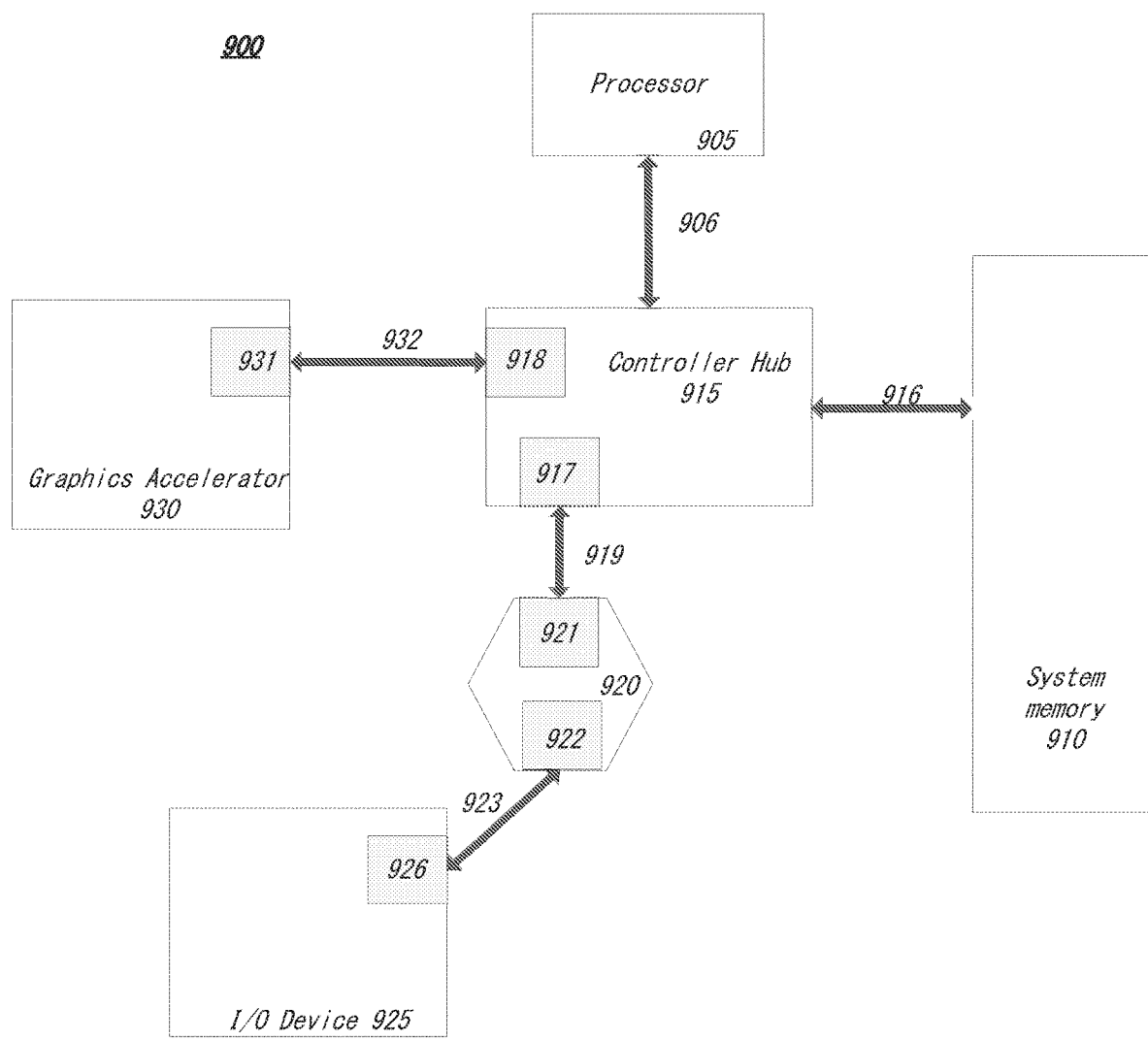
FIG. 9 illustrates an embodiment of a computing system including an interconnect architecture.

Referring to FIG. 9, an embodiment of a fabric composed of point-to-point Links that interconnect a set of components is illustrated. System 900 includes processor 905 and system memory 910 coupled to controller hub 915. Processor 905 includes any processing element, such as a microprocessor, a host processor, an embedded processor, a co-processor, or other processor. Processor 905 is coupled to controller hub 915 through front-side bus (FSB) 906. In one embodiment, FSB 906 is a serial point-to-point interconnect as described below. In another embodiment, link 906 includes a serial, differential interconnect architecture that is compliant with different interconnect standard.

System memory 910 includes any memory device, such as random access memory (RAM), non-volatile (NV) memory, or other memory accessible by devices in system 900. System memory 910 is coupled to controller hub 915 through memory interface 916. Examples of a memory interface include a double-data rate (DDR) memory interface, a dual-channel DDR memory interface, and a dynamic RAM (DRAM) memory interface.

In one embodiment, controller hub 915 is a root hub, root complex, or root controller in a Peripheral Component Interconnect Express (PCIe or PCIE) interconnection hierarchy. Examples of controller hub 915 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with processor 905, while controller 915 is to communicate with I/O devices, in a similar manner as described below. In some embodiments, peer-to-peer routing is optionally supported through root complex 915.

Here, controller hub 915 is coupled to switch/bridge 920 through serial link 919. Input/output modules 917 and 921, which may also be referred to as interfaces/ports 917 and 921, include/implement a layered protocol stack to provide communication between controller hub 915 and switch 920. In one embodiment, multiple devices are capable of being coupled to switch 920.

Switch/bridge 920 routes packets/messages from device 925 upstream, i.e. up a hierarchy towards a root complex, to controller hub 915 and downstream, i.e. down a hierarchy away from a root controller, from processor 905 or system memory 910 to device 925. Switch 920, in one embodiment, is referred to as a logical assembly of multiple virtual PCI-to-PCI bridge devices. Device 925 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 925 may include a PCIe to PCI/PCI-X bridge to support legacy or other version PCI devices. Endpoint devices in PCIe are often classified as legacy, PCIe, or root complex integrated endpoints.

Graphics accelerator 930 is also coupled to controller hub 915 through serial link 932. In one embodiment, graphics accelerator 930 is coupled to an MCH, which is coupled to an ICH. Switch 920, and accordingly I/O device 925, is then coupled to the ICH. I/O modules 931 and 918 are also to implement a layered protocol stack to communicate between graphics accelerator 930 and controller hub 915. Similar to the MCH discussion above, a graphics controller or the graphics accelerator 930 itself may be integrated in processor 905.

Figure 10:
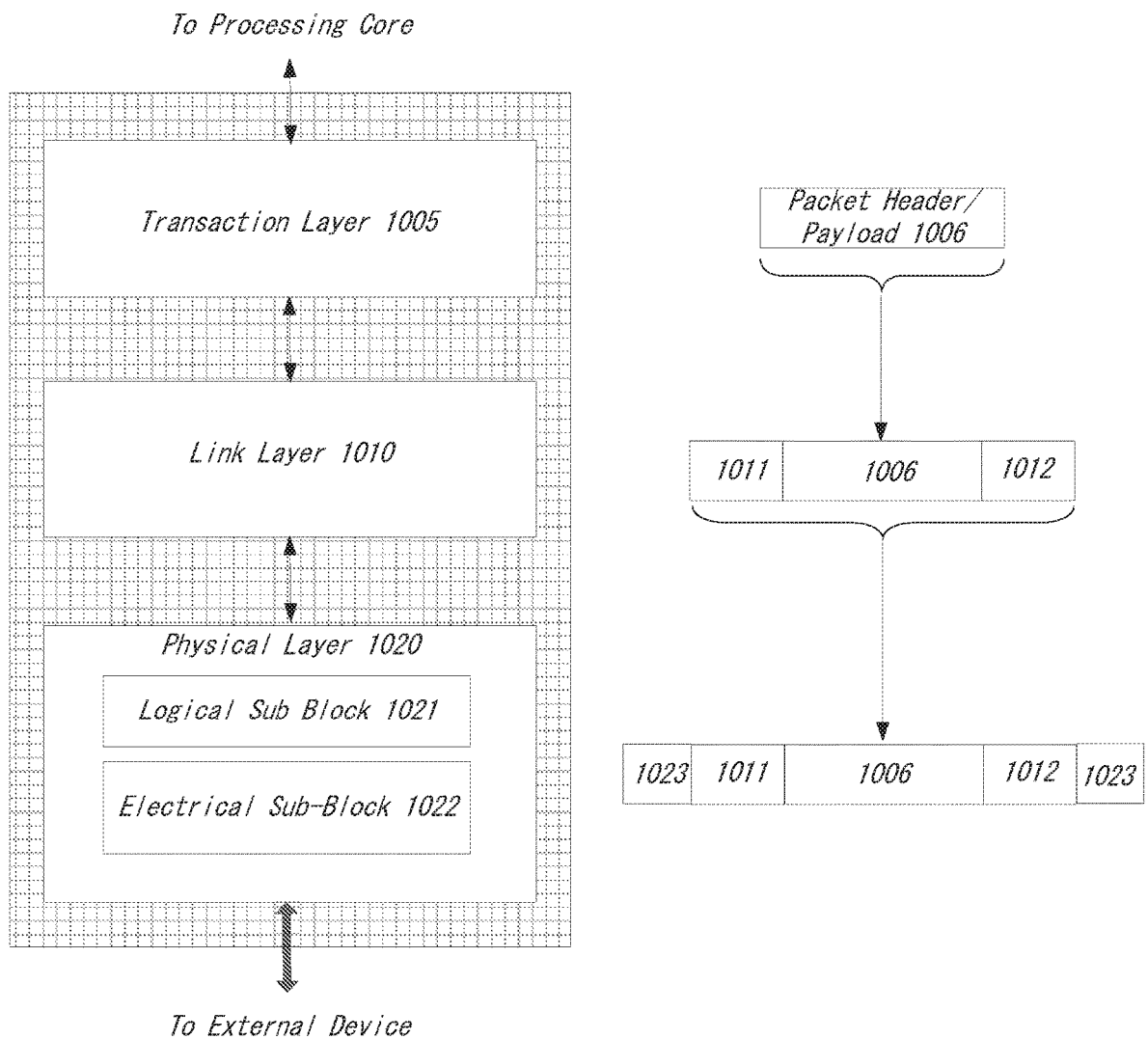
FIG. 10 illustrates an embodiment of a interconnect architecture including a layered stack.

Turning to FIG. 10 an embodiment of a layered protocol stack is illustrated. Layered protocol stack 1000 includes any form of a layered communication stack, such as a Quick Path Interconnect (QPI) stack, a PCie stack, a next generation high performance computing interconnect stack, or other layered stack. Although the discussion immediately below in reference to FIGS. 8-11 are in relation to a PCIe stack, the same concepts may be applied to other interconnect stacks. In one embodiment, protocol stack 1000 is a PCIe protocol stack including transaction layer 1005, link layer 1010, and physical layer 1020. An interface, such as interfaces 917, 918, 921, 922, 926, and 931 in FIG. 9, may be represented as communication protocol stack 1000. Representation as a communication protocol stack may also be referred to as a module or interface implementing/including a protocol stack.

PCI Express uses packets to communicate information between components. Packets are formed in the Transaction Layer 1005 and Data Link Layer 1010 to carry the information from the transmitting component to the receiving component. As the transmitted packets flow through the other layers, they are extended with additional information necessary to handle packets at those layers. At the receiving side the reverse process occurs and packets get transformed from their Physical Layer 1020 representation to the Data Link Layer 1010 representation and finally (for Transaction Layer Packets) to the form that can be processed by the Transaction Layer 1005 of the receiving device.

Transaction Layer

In one embodiment, transaction layer 1005 is to provide an interface between a device's processing core and the interconnect architecture, such as data link layer 1010 and physical layer 1020. In this regard, a primary responsibility of the transaction layer 1005 is the assembly and disassembly of packets (i.e., transaction layer packets, or TLPs). The translation layer 1005 typcially manages credit-base flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 1005. An external device at the opposite end of the link, such as controller hub 915 in FIG. 9, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 1005 assembles packet header/payload 1006. Format for current packet headers/payloads may be found in the PCIe specification at the PCIe specification website.

Figure 11:
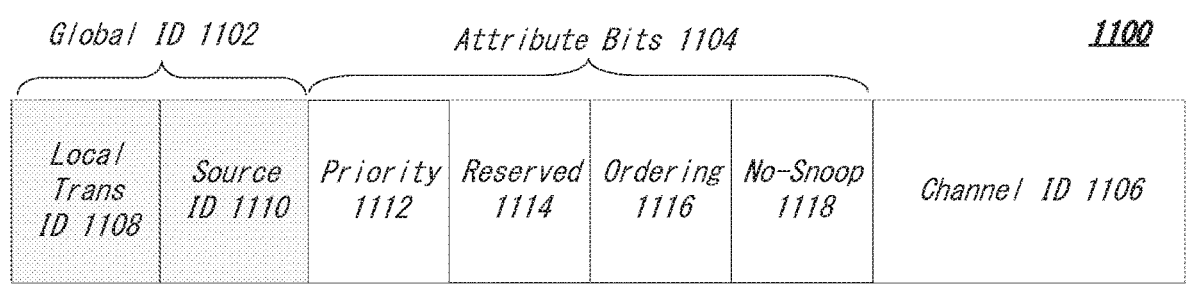
FIG. 11 illustrates an embodiment of a request or packet to be generated or received within an interconnect architecture.

Quickly referring to FIG. 11, an embodiment of a PCIe transaction descriptor is illustrated. In one embodiment, transaction descriptor 1100 is a mechanism for carrying transaction information. In this regard, transaction descriptor 1100 supports identification of transactions in a system. Other potential uses include tracking modifications of default transaction ordering and association of transaction with channels.

Transaction descriptor 1100 includes global identifier field 1102, attributes field 1104 and channel identifier field 1106. In the illustrated example, global identifier field 1102 is depicted comprising local transaction identifier field 1108 and source identifier field 1110. In one embodiment, global transaction identifier 1102 is unique for all outstanding requests.

According to one implementation, local transaction identifier field 1108 is a field generated by a requesting agent, and it is unique for all outstanding requests that require a completion for that requesting agent. Furthermore, in this example, source identifier 1110 uniquely identifies the requestor agent within a PCIe hierarchy. Accordingly, together with source ID 1110, local transaction identifier 1108 field provides global identification of a transaction within a hierarchy domain.

Attributes field 1104 specifies characteristics and relationships of the transaction. In this regard, attributes field 1104 is potentially used to provide additional information that allows modification of the default handling of transactions. In one embodiment, attributes field 1104 includes priority field 1112, reserved field 1114, ordering field 1116, and no-snoop field 1118. Here, priority sub-field 1112 may be modified by an initiator to assign a priority to the transaction. Reserved attribute field 1114 is left reserved for future, or vendor-defined usage. Possible usage models using priority or security attributes may be implemented using the reserved attribute field.

In this example, ordering attribute field 1116 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 1118 is utilized to determine if transactions are snooped. As shown, channel ID Field 1106 identifies a channel that a transaction is associated with.

Link Layer

Link layer 1010, also referred to as data link layer 1010, acts as an intermediate stage between transaction layer 1005 and the physical layer 1020. In one embodiment, a responsibility of the data link layer 1010 is providing a reliable mechanism for exchanging Transaction Layer Packets (TLPs) between two components a link. One side of the Data Link Layer 1010 accepts TLPs assembled by the Transaction Layer 1005, applies packet sequence identifier 1011, i.e. an identification number or packet number, calculates and applies an error detection code, i.e. CRC 1012, and submits the modified TLPs to the Physical Layer 1020 for transmission across a physical to an external device.

Physical Layer

In one embodiment, physical layer 1020 includes logical sub block 1021 and electrical sub-block 1022 to physically transmit a packet to an external device. Here, logical sub-block 1021 is responsible for the "digital" functions of Physical Layer 1021. In this regard, the logical sub-block includes a transmit section to prepare outgoing information for transmission by physical sub-block 1022, and a receiver section to identify and prepare received information before passing it to the Link Layer 1010.

Physical block 1022 includes a transmitter and a receiver. The transmitter is supplied by logical sub-block 1021 with symbols, which the transmitter serializes and transmits onto to an external device. The receiver is supplied with serialized symbols from an external device and transforms the received signals into a bit-stream. The bit-stream is deserialized and supplied to logical sub-block 1021. In one embodiment, an 8b/10b transmission code is employed, where ten-bit symbols are transmitted/received. Here, special symbols are used to frame a packet with frames 1023. In addition, in one example, the receiver also provides a symbol clock recovered from the incoming serial stream.

As stated above, although transaction layer 1005, link layer 1010, and physical layer 1020 are discussed in reference to a specific embodiment of a PCIe protocol stack, a layered protocol stack is not so limited. In fact, any layered protocol may be included/implemented. As an example, an port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

Figure 12:
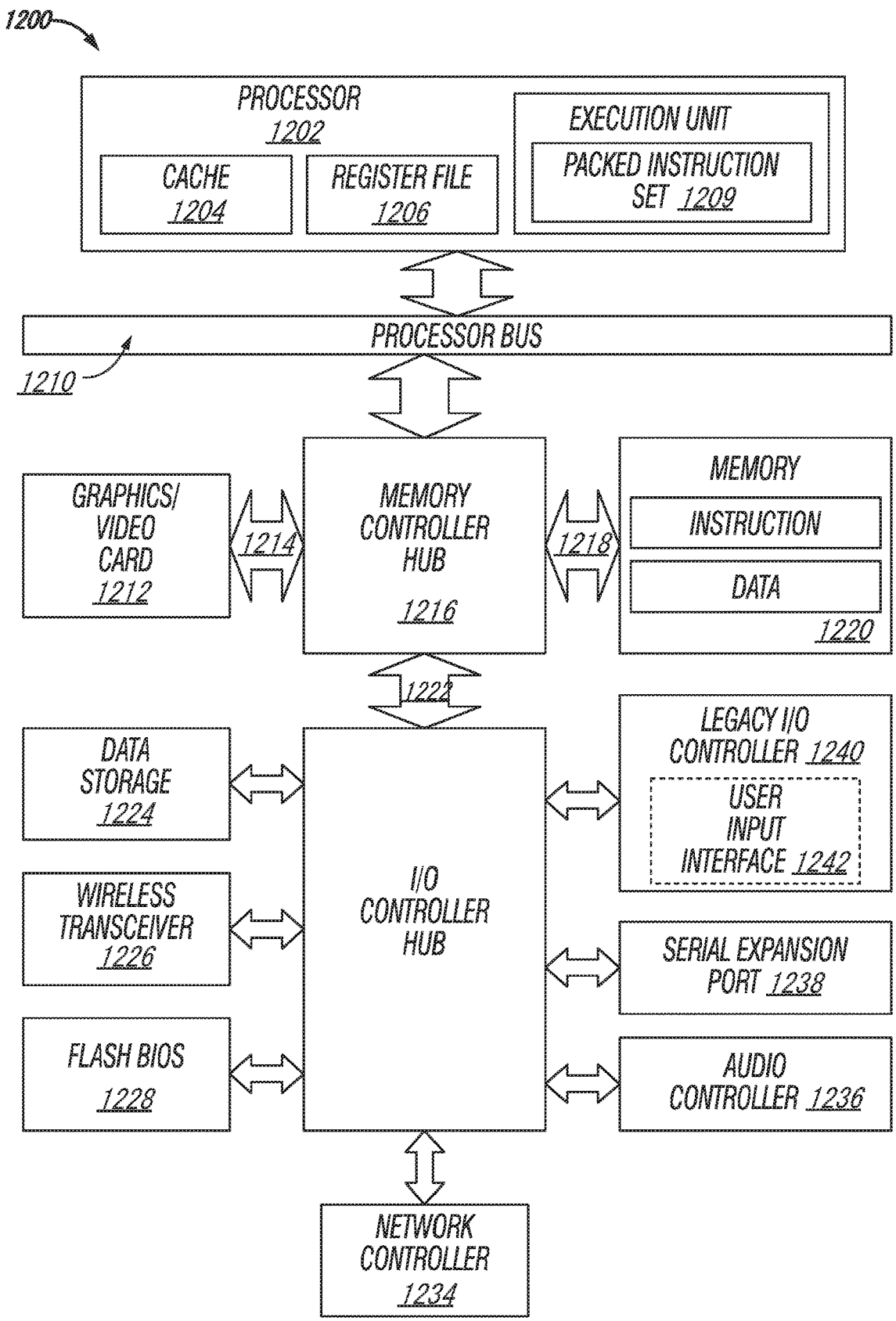
FIG. 12 illustrates another embodiment of a block diagram for a computing system including a processor.

Turning to FIG. 12, a block diagram of an exemplary computer system formed with a processor that includes execution units to execute an instruction, where one or more of the interconnects implement one or more features in accordance with one embodiment of the present invention is illustrated. System 1200 includes a component, such as a processor 1202 to employ execution units including logic to perform algorithms for process data, in accordance with the present invention, such as in the embodiment described herein. System 1200 is representative of processing systems based on the PENTIUM III™, PENTIUM 4™ Xeon™, Itanium, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 1200 executes a version of the WINDOWS™ operating system available from Microsoft Corporation of Redmond, Wash., although other operating systems (UNIX and Linux for example), embedded software, and/or graphical user interfaces, may also be used. Thus, embodiments of the present invention are not limited to any specific combination of hardware circuitry and software.

Embodiments are not limited to computer systems. Alternative embodiments of the present invention can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

In this illustrated embodiment, processor 1202 includes one or more execution units 1208 to implement an algorithm that is to perform at least one instruction. One embodiment may be described in the context of a single processor desktop or server system, but alternative embodiments may be included in a multiprocessor system. System 1200 is an example of a 'hub' system architecture. The computer system 1200 includes a processor 1202 to process data signals. The processor 1202, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 1202 is coupled to a processor bus 1210 that transmits data signals between the processor 1202 and other components in the system 1200. The elements of system 1200 (e.g. graphics accelerator 1212, memory controller hub 1216, memory 1220, I/O controller hub 1224, wireless transceiver 1226, Flash BIOS 1228, Network controller 1234, Audio controller 1236, Serial expansion port 1238, I/O controller 1240, etc.) perform their conventional functions that are well known to those familiar with the art.

In one embodiment, the processor 1202 includes a Level 1 (L1) internal cache memory 1204. Depending on the architecture, the processor 1202 may have a single internal cache or multiple levels of internal caches. Other embodiments include a combination of both internal and external caches depending on the particular implementation and needs. Register file 1206 is to store different types of data in various registers including integer registers, floating point registers, vector registers, banked registers, shadow registers, checkpoint registers, status registers, and instruction pointer register.

Execution unit 1208, including logic to perform integer and floating point operations, also resides in the processor 1202. The processor 1202, in one embodiment, includes a microcode (ucode) ROM to store microcode, which when executed, is to perform algorithms for certain macroinstructions or handle complex scenarios. Here, microcode is potentially updateable to handle logic bugs/fixes for processor 1202. For one embodiment, execution unit 1208 includes logic to handle a packed instruction set 1209. By including the packed instruction set 1209 in the instruction set of a general-purpose processor 1202, along with associated circuitry to execute the instructions, the operations used by many multimedia applications may be performed using packed data in a general-purpose processor 1202. Thus, many multimedia applications are accelerated and executed more efficiently by using the full width of a processor's data bus for performing operations on packed data. This potentially eliminates the need to transfer smaller units of data across the processor's data bus to perform one or more operations, one data element at a time.

Alternate embodiments of an execution unit 1208 may also be used in micro controllers, embedded processors, graphics devices, DSPs, and other types of logic circuits. System 1200 includes a memory 1220. Memory 1220 includes a dynamic random access memory (DRAM) device, a static random access memory (SRAM) device, flash memory device, or other memory device. Memory 1220 stores instructions and/or data represented by data signals that are to be executed by the processor 1202.

Note that any of the aforementioned features or aspects of the invention may be utilized on one or more interconnect illustrated in FIG. 12. For example, an on-die interconnect (ODI), which is not shown, for coupling internal units of processor 1202 implements one or more aspects of the invention described above. Or the invention is associated with a processor bus 1210 (e.g. Intel Quick Path Interconnect (QPI) or other known high performance computing interconnect), a high bandwidth memory path 1218 to memory 1220, a point-to-point link to graphics accelerator 1212 (e.g. a Peripheral Component Interconnect express (PCIe) compliant fabric), a controller hub interconnect 1222, an I/O or other interconnect (e.g. USB, PCI, PCIe) for coupling the other illustrated components. Some examples of such components include the audio controller 1236, firmware hub (flash BIOS) 1228, wireless transceiver 1226, data storage 1224, legacy I/O controller 1210 containing user input and keyboard interfaces 1242, a serial expansion port 1238 such as Universal Serial Bus (USB), and a network controller 1234. The data storage device 1224 can comprise a hard disk drive, a floppy disk drive, a CD-ROM device, a flash memory device, or other mass storage device.

Figure 13:
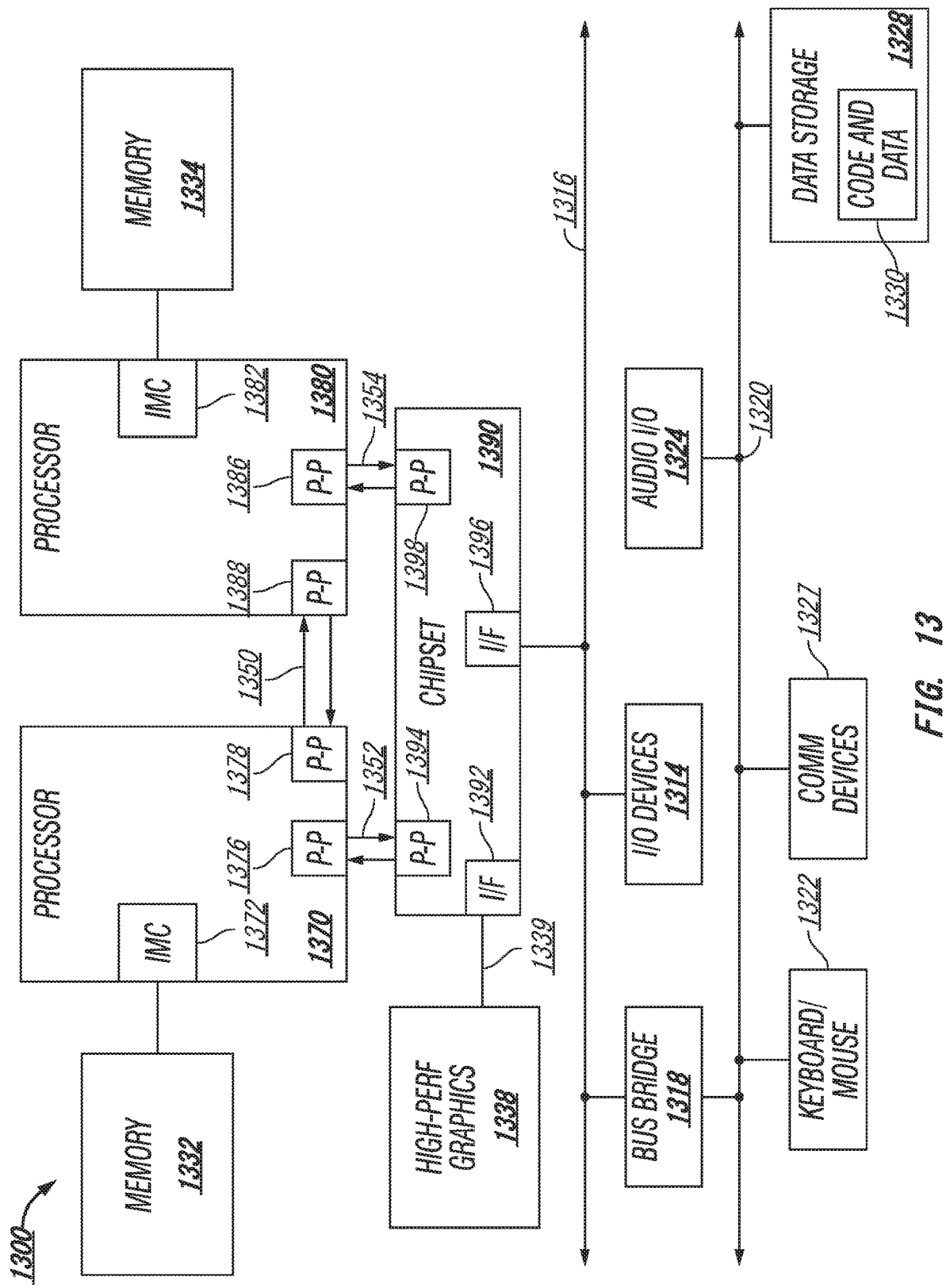
FIG. 13 illustrates an embodiment of a block for a computing system including multiple processor sockets.

Referring now to FIG. 13, shown is a block diagram of a second system 1300 in accordance with an embodiment of the present invention. As shown in FIG. 13, multiprocessor system 1300 is a point-to-point interconnect system, and includes a first processor 1370 and a second processor 1380 coupled via a point-to-point interconnect 1350. Each of processors 1370 and 1380 may be some version of a processor. In one embodiment, 1352 and 1354 are part of a serial, point-to-point coherent interconnect fabric, such as Intel's Quick Path Interconnect (QPI) architecture. As a result, the invention may be implemented within the QPI architecture.

While shown with only two processors 1370, 1380, it is to be understood that the scope of the present invention is not so limited. In other embodiments, one or more additional processors may be present in a given processor.

Processors 1370 and 1380 are shown including integrated memory controller units 1372 and 1382, respectively. Processor 1370 also includes as part of its bus controller units point-to-point (P-P) interfaces 1376 and 1378; similarly, second processor 1380 includes P-P interfaces 1386 and 1388. Processors 1370, 1380 may exchange information via a point-to-point (P-P) interface 1350 using P-P interface circuits 1378, 1388. As shown in FIG. 13, IMCs 1372 and 1382 couple the processors to respective memories, namely a memory 1332 and a memory 1334, which may be portions of main memory locally attached to the respective processors.

Processors 1370, 1380 each exchange information with a chipset 1390 via individual P-P interfaces 1352, 1354 using point to point interface circuits 1376, 1394, 1386, 1398. Chipset 1390 also exchanges information with a high-performance graphics circuit 1338 via an interface circuit 1392 along a high-performance graphics interconnect 1339.

A shared cache (not shown) may be included in either processor or outside of both processors; yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of the present invention is not so limited.

As shown in FIG. 13, various I/O devices 1314 are coupled to first bus 1316, along with a bus bridge 1318 which couples first bus 1316 to a second bus 1320. In one embodiment, second bus 1320 includes a low pin count (LPC) bus. Various devices are coupled to second bus 1320 including, for example, a keyboard and/or mouse 1322, communication devices 1327 and a storage unit 1328 such as a disk drive or other mass storage device which often includes instructions/code and data 1330, in one embodiment. Further, an audio I/O 1324 is shown coupled to second bus 1320. Note that other architectures are possible, where the included components and interconnect architectures vary. For example, instead of the point-to-point architecture of FIG. 13, a system may implement a multi-drop bus or other such architecture.

The foregoing disclosure has presented a number of example testing link states, which may supplement standard link states defined in an interconnect protocol. It should be appreciated that other testing link states may be provided in addition to those identified above without departing from the more generalized principles contained within this disclosure. For instance, while some of the example state machines and ordered sequences discussed herein were described with reference to PCIe or PCIe-based protocols, it should be appreciated that similar, corresponding enhancements may be made to other interconnect protocols, such OpenCAPI™, Gen-Z™, UPI, Universal Serial Bus, (USB), Cache Coherent Interconnect for Accelerators (CCIX™), Advanced Micro Device's (AMD™) Infinity™, Common Communication Interface (CCI), or Qualcomm™'s Centrig™ interconnect, among others.

Note that the apparatus', methods', and systems described above may be implemented in any electronic device or system as aforementioned. As specific illustrations, the figures below provide exemplary systems for utilizing the disclosure as described herein. As the systems below are described in more detail, a number of different interconnects are disclosed, described, and revisited from the discussion above. And as is readily apparent, the advances described above may be applied to any of those interconnects, fabrics, or architectures. For instance, a host and device may be implemented, which are equipped with functionality to implement authentication and measurement architectures as discussed in the examples above, in any one of a variety of computing architectures (e.g., using any one of a variety of different interconnects or fabrics). For instance, a host may connect to a device supporting the authentication architecture within a personal computing system (e.g., implemented in a laptop, desktop, mobile, smartphone, Internet of Things (IoT) device, smart appliance, gaming console, media console, etc.). In another example, a host may connect to a device supporting the authentication architecture within a server computing system (e.g., a rack server, blade server, tower server, rack scale server architecture or other disaggregated server architecture), among other examples.

The systems, methods, and apparatuses can include one or a combination of the following examples:

Example 1 is an apparatus for configuring a multi-lane link, the apparatus comprising a port comprising hardware to support the multi-lane link, the link comprising a lane that comprises a first differential signal pair and a second differential signal pair, wherein the first differential signal pair is initially configured to transmit data and the second differential signal pair is initially configured to receive data; and link configuration logic, implemented at least in part in hardware circuitry, to determine that the port comprises hardware to support one or both of receiving data on the first differential signal pair or transmitting data on the second differential signal pair, and reconfigure the first differential signal pair to receive data with the second differential signal pair or reconfigure the second differential signal pair to transmit data with the first differential signal pair; and wherein the port is to transmit data and receive data based on reconfiguration of one or both the first differential signal pair and the second differential signal pair.

Example 2 may include the subject matter of example 1, wherein the port comprises a Peripheral Component Interconnect Express (PCIe)-based port.

Example 3 may include the subject matter of any of examples 1-2, wherein the link configuration logic is to receive an advertisement during a link training phase of operation, the advertisement indicating that the port comprises hardware to support one or both of receiving data on the first differential signal pair or transmitting data on the second differential signal pair.

Example 4 may include the subject matter of any of examples 1-3, wherein the link configuration logic is to perform link equalization for the first and second differential signal pairs.

Example 5 may include the subject matter of any of examples 1-4, wherein the apparatus comprises a buffer memory coupled to the port to buffer transmit data to be transmitted on the first and second differential signal pairs, or to buffer receive data received on the first and second differential signal pairs.

Example 6 may include the subject matter of example 5, wherein the buffer memory comprises a common stack for each of the first and the second differential signal pairs.

Example 7 may include the subject matter of example 5, wherein the buffer memory comprises a first stack for the first differential signal pair and a second stack for the second differential signal pair.

Example 8 may include the subject matter of any of examples 1-7, wherein the port comprises hardware to support a plurality of TX lines and a plurality of RX lines, wherein the port comprises hardware to receive data on a subset of the plurality of TX lines and/or to transmit data on a subset of the plurality of RX lines.

Example 9 may include the subject matter of example 8, wherein the link configuration logic is to assign a lane number to the subset of the plurality of TX lines or to the subset of the plurality of RX lines.

Example 10 may include the subject matter of any of examples 1-9, wherein the port comprises hardware to receive control signaling on the first differential signal pair or transmit control signaling on the second differential signal pair.

Example 11 may include the subject matter of any of examples 1-10, wherein the link configuration logic is to determine to reconfigure the first or second differential signal pair based on bandwidth utilization information.

Example 12 is at least one non-transitory machine accessible storage medium having instructions stored thereon, the instructions when executed on a machine, cause the machine to detect a connection of a device to a host device across a link, wherein the link comprises a first signal channel initially configured to transmit data from the device to the host device and a second signal channel initially configured to receive data at the device from the host device; receive a capabilities advertisement from the device indicating that the device can support at least one of conversion of the first signal channel to receive data or conversion of the second signal channel to transmit data; and perform lane configuration to reconfigure the first signal channel to receive data or to reconfigure the second signal channel to transmit data; and communicate data over the link based on reconfiguration of one or both of the first and second signal channels.

Example 13 may include the subject matter of example 12, wherein the instructions cause the machine, when executed, to perform link training on one or more lanes connecting the host to the device; detect a capability advertisement during link training indicating that the device can support at least one of conversion of the first signal channel to receive data or conversion of the second signal channel to transmit data; and configure the first signal channel to receive data or configure the second signal channel to transmit data; and perform equalization on the lanes during link training.

Example 14 may include the subject matter of example 13, wherein the instructions cause the machine, when executed, to cause the machine to enter into an L0 state of an active state power management (ASPM) protocol after completion of link training.

Example 15 may include the subject matter of example 13, wherein the instructions cause the machine, when executed, to determine a bandwidth utilization capability of the device based on link training; and configure the multi-lane link to be asymmetrical based, at least in part, on the bandwidth utilization capability.

Example 16 may include the subject matter of example 13, wherein the instructions cause the machine, when executed, to detect an indication from the device to return one or more lanes to a default state; and reconfigure the link to return to a default state.

Example 17 is a system comprising a host comprising a data processor, a port, and a system manager; and a device connected to the host across a multi-lane link, the multi-lane link comprising a lane that comprises a first differential signal pair initially configured to transmit data within a first lane of the link and a second differential signal pair initially configured to receive data within the first lane of the link; wherein the system manager is to detect a capability advertisement from the device indicating that the device is capable to use the first differential signal pair to receive data or the second differential signal pair to transmit data; reconfigure the first differential signal pair to receive data or reconfigure the second differential signal pair to transmit data based at least in part on the capability advertisement; and perform data transmission on the first and second differential signal pairs following reconfiguration of the second differential signal pair or data reception on the first and second differential signal pairs following reconfiguration of the first differential signal pair.

Example 18 may include the subject matter of example 17, wherein the port comprises a Peripheral Component Interconnect Express (PCIe)-based port.

Example 19 may include the subject matter of any of examples 17-18, wherein the system manager is to receive an advertisement during a link training phase of operation, the advertisement indicating that the port comprises hardware to the first differential signal pair to receive data or the second differential signal pair to transmit data.

Example 20 may include the subject matter of any of examples 17-19, wherein the system manager logic is to perform link equalization for the first and second differential signal pairs.

Example 21 may include the subject matter of any of examples 17-20, and can also include a buffer memory coupled to the port to buffer TX data to be transmitted on the first and second differential signal pairs, or to buffer RX data received on the first and second differential signal pairs.

Example 22 may include the subject matter of example 21, wherein the buffer memory comprises a common stack for each of the first and the second differential signal pairs.

Example 23 may include the subject matter of example 21, wherein the buffer memory comprises a first stack for the first differential signal pair and a second stack for the second differential signal pair.

Example 24 may include the subject matter of any of examples 17-23, wherein system manager is to determine that the device uses more downstream bandwidth than upstream bandwidth; configure the second differential signal pairs line to transmit data; and perform data transmissions on the first and second differential signal pairs.

Example 25 may include the subject matter of any of examples 17-24, wherein system manager is to determine that the device uses more upstream bandwidth than downstream bandwidth; configure the first differential pair to receive data; and perform data reception on the first and second differential pairs.

Example 26 is a method that includes detecting a connection of a device to a host device across a link, wherein the link comprises a first signal channel initially configured to transmit data from the device to the host device and a second signal channel initially configured to receive data at the device from the host device; receiving a capabilities advertisement from the device indicating that the device can support at least one of conversion of the first signal channel to receive data or conversion of the second signal channel to transmit data; and performing lane configuration to reconfigure the first signal channel to receive data or to reconfigure the second signal channel to transmit data; and communicate data over the link based on reconfiguration of one or both of the first and second signal channels.

Example 27 may include the subject matter of example 26, further including performing link training on one or more lanes connecting the host to the device; detecting a capability advertisement during link training indicating that the device can support at least one of conversion of the first signal channel to receive data or conversion of the second signal channel to transmit data; and configuring the first signal channel to receive data or configure the second signal channel to transmit data; and perform equalization on the lanes during link training.

Example 28 may include the subject matter of example 27, further including causing the machine to enter into an L0 state of an active state power management (ASPM) protocol after completion of link training.

Example 29 may include the subject matter of example 27, further including determining a bandwidth utilization capability of the device based on link training; and configuring the multi-lane link to be asymmetrical based, at least in part, on the bandwidth utilization capability.

Example 30 may include the subject matter of example 27, further including detecting an indication from the device to return one or more lanes to a default state; and reconfiguring the link to return to a default state.

Example 31 is an apparatus for configuring a multi-lane link, the apparatus comprising a port comprising hardware to support the multi-lane link, the link comprising a lane that comprises a first differential signal pair and a second differential signal pair, wherein the first differential signal pair is initially configured to transmit data and the second differential signal pair is initially configured to receive data; means for determining that the port comprises hardware to support one or both of receiving data on the first differential signal pair or transmitting data on the second differential signal pair, and means for reconfiguring the first differential signal pair to receive data with the second differential signal pair or reconfigure the second differential signal pair to transmit data with the first differential signal pair; and wherein the port is to transmit data and receive data based on reconfiguration of one or both the first differential signal pair and the second differential signal pair.

What is claimed is:

1. An apparatus for configuring a multi-lane link, the apparatus comprising:
   a port comprising hardware to support the multi-lane link, the link comprising a lane that comprises a first differential signal pair and a second differential signal pair, wherein the first differential signal pair is initially configured to transmit data and the second differential signal pair is initially configured to receive data; and
   link configuration logic, implemented at least in part in hardware circuitry, to:
      determine that the port comprises hardware to support one or both of receiving data on the first differential signal pair or transmitting data on the second differential signal pair;
      perform link equalization for the first differential signal pair in a receive direction and a transmit direction and perform link equalization for the second differential signal pairs in a receive direction and a transmit direction before initialization of the multi-lane link is complete; and
      reconfigure the first differential signal pair to receive data with the second differential signal pair or reconfigure the second differential signal pair to transmit data with the first differential signal pair; and
   wherein the port is to transmit data or receive data based on reconfiguration of one or both the first differential signal pair and the second differential signal pair.

2. The apparatus of claim 1, wherein the port comprises a Peripheral Component Interconnect Express (PCIe)-based port.

3. The apparatus of claim 1, wherein the link configuration logic is to receive an advertisement during a link training phase of operation, the advertisement indicating that the port comprises hardware to support one or both of receiving data on the first differential signal pair or transmitting data on the second differential signal pair.

4. The apparatus of claim 1, wherein the link configuration logic is to perform link equalization for the first and second differential signal pairs.

5. The apparatus of claim 1, wherein the apparatus comprises a buffer memory coupled to the port to buffer transmit data to be transmitted on the first and second differential signal pairs, or to buffer receive data received on the first and second differential signal pairs.

6. The apparatus of claim 5, wherein the buffer memory comprises a common stack for each of the first and the second differential signal pairs.

7. The apparatus of claim 5, wherein the buffer memory comprises a first stack for the first differential signal pair and a second stack for the second differential signal pair.

8. The apparatus of claim 1, wherein the port comprises hardware to support a plurality of TX lines and a plurality of RX lines, wherein the port comprises hardware to receive data on a subset of the plurality of TX lines and/or to transmit data on a subset of the plurality of RX lines.

9. The apparatus of claim 8, wherein the link configuration logic is to assign a lane number to the subset of the plurality of TX lines or to the subset of the plurality of RX lines.

10. The apparatus of claim 1, wherein the port comprises hardware to receive control signaling on the first differential signal pair or transmit control signaling on the second differential signal pair.

11. The apparatus of claim 1, wherein the link configuration logic is to determine to reconfigure the first or second differential signal pair based on bandwidth utilization information.

12. At least one non-transitory machine accessible storage medium having instructions stored thereon, the instructions when executed on a machine, cause the machine to:
   detect a connection of a device to a host device across a link, wherein the link comprises a first signal channel initially configured to transmit data from the device to the host device and a second signal channel initially configured to receive data at the device from the host device;
   receive a capabilities advertisement from the device indicating that the device can support at least one of conversion of the first signal channel to receive data or conversion of the second signal channel to transmit data;
   perform link equalization for the first signal channel in a receive direction and a transmit direction and perform link equalization for the second signal channel in a receive direction and a transmit direction before initialization of the link is complete; and
   perform lane configuration to reconfigure the first signal channel to receive data or to reconfigure the second signal channel to transmit data; and
   communicate data over the link based on reconfiguration of one or both of the first and second signal channels.

13. The at least one non-transitory machine accessible storage medium of claim 12, wherein the instructions cause the machine, when executed, to:
   perform link training on one or more lanes connecting the host to device the device;
   detect a capability advertisement during link training indicating that the device can support at least one of conversion of the first signal channel to receive data or conversion of the second signal channel to transmit data; and
   configure the first signal channel to receive data or configure the second signal channel to transmit data; and
   perform equalization on the lanes during link training.

14. The at least one non-transitory machine accessible storage medium of claim 13, wherein the instructions cause the machine, when executed, to cause the machine to enter into an L0 state of an active state power management (ASPM) protocol after completion of link training.

15. The at least one non-transitory machine accessible storage medium of claim 13, wherein the instructions cause the machine, when executed, to:
   determine a bandwidth utilization capability of the device based on link training; and
   configure the link to be asymmetrical based, at least in part, on the bandwidth utilization capability.

16. The at least one non-transitory machine accessible storage medium of claim 13, wherein the instructions cause the machine, when executed, to:
   detect an indication from the device to return one or more lanes to a default state; and
   reconfigure the link to return to a default state.

17. A system comprising:
   a host comprising a data processor, a port, and a system manager; and
   a device connected to the host across a multi-lane link, the multi-lane link comprising a lane that comprises a first differential signal pair initially configured to transmit data within a first lane of the link and a second differential signal pair initially configured to receive data within the first lane of the link;
   wherein the system manager is to:
      detect a capability advertisement from the device, wherein the capability advertisement indicates that the device is capable to use the first differential signal pair to receive data or the second differential signal pair to transmit data;
      perform link equalization for the first differential signal pair in a receive direction and a transmit direction and perform link equalization for the second differential signal pairs in a receive direction and a transmit direction before initialization of the multi-lane link is complete;
      reconfigure the first differential signal pair to receive data or reconfigure the second differential signal pair to transmit data based at least in part on the capability advertisement; and
      perform data transmission on the first and second differential signal pairs following reconfiguration of the second differential signal pair or data reception on the first and second differential signal pairs following reconfiguration of the first differential signal pair.

18. The system of claim 17, wherein the port comprises a Peripheral Component Interconnect Express (PCIe)-based port.

19. The system of claim 17, wherein the system manager is to receive an advertisement during a link training phase of operation, the advertisement indicating that the port comprises hardware to the first differential signal pair to receive data or the second differential signal pair to transmit data.

20. The system of claim 17, wherein the system manager is to perform link equalization for the first and second differential signal pairs.

21. The system of claim 17, further comprising a buffer memory coupled to the port to buffer TX data to be transmitted on the first and second differential signal pairs, or to buffer RX data received on the first and second differential signal pairs.

22. The system of claim 21, wherein the buffer memory comprises a common stack for each of the first and the second differential signal pairs.

23. The system of claim 21, wherein the buffer memory comprises a first stack for the first differential signal pair and a second stack for the second differential signal pair.

24. The apparatus of claim 1, wherein the link configuration logic is to:
   configure all but one lane of the multi-lane link in a transmit direction; and
   configure one lane of the multi-lane link to be time-multiplexed bidirectional lane.

25. The apparatus of claim 1, further comprising a retimer, wherein the first differential signal pair are connected to the retimer, wherein the retimer is configurable to send data to the port on the first differential signal pair and configurable to receive data from the port on the first differential signal pair.

* * * * *

UNITED STATES PATENT AND TRADEMARK OFFICE
CERTIFICATE OF CORRECTION

PATENT NO. : 11,467,999 B2
APPLICATION NO. : 16/023739
DATED : October 11, 2022
INVENTOR(S) : Debendra Das Sharma It is certified that error appears in the above-identified patent and that said Letters Patent is hereby corrected as shown below:

In the Claims

In Column 29, Line 33, delete "host to device the device" and insert -- host device to the device --, therefor.

Signed and Sealed this
Twenty-seventh Day of June, 2023

Katherine Kelly Vidal
*Director of the United States Patent and Trademark Office*